United States Patent
Schmitz et al.

(10) Patent No.: US 10,270,915 B2
(45) Date of Patent: Apr. 23, 2019

(54) SYSTEM AND METHOD TO IMPROVE MANAGEMENT DURING A CONFERENCE CALL

(71) Applicant: SWN Communications, Inc., Secaucus, NJ (US)

(72) Inventors: Anthony Schmitz, Clifton, NJ (US); Alexandros Tsepetis, Wenham, MA (US)

(73) Assignee: SWN COMMUNICATIONS, INC.

( * ) Notice: Subject to any disclaimer, the term of this patent is extended or adjusted under 35 U.S.C. 154(b) by 0 days.

(21) Appl. No.: 15/177,254

(22) Filed: Jun. 8, 2016

(65) Prior Publication Data
US 2016/0352911 A1    Dec. 1, 2016

Related U.S. Application Data

(63) Continuation-in-part of application No. 14/507,967, filed on Oct. 7, 2014, and a continuation-in-part of application No. 14/305,181, filed on Jun. 16, 2014.
(Continued)

(51) Int. Cl.
*H04M 3/56* (2006.01)
*H04M 3/42* (2006.01)
(Continued)

(52) U.S. Cl.
CPC ........ *H04M 3/564* (2013.01); *G06F 16/1873* (2019.01); *H04L 12/1827* (2013.01);
(Continued)

(58) Field of Classification Search
CPC ..... G06F 17/3023; H04M 3/56; H04M 3/564; H04M 3/42165; H04M 3/42195; H04M 3/565; H04M 3/567; H04L 12/1895; H04L 65/1089; H04L 65/1093; H04L 65/4015; H04L 51/043; H04W 4/12; H04W 4/22; H04W 64/00; G06L 65/403
(Continued)

(56) References Cited

U.S. PATENT DOCUMENTS 6,711,608 B1    3/2004    Ogilvie
7,224,373 B1    5/2007    Duarte
(Continued)

*Primary Examiner* — Kamran Afshar
*Assistant Examiner* — Farid Seyedvosoghi
(74) *Attorney, Agent, or Firm* — Jennifer Meredith, Esq.; Meredith & Keyhani, PLLC

(57) ABSTRACT

A method for managing operations during a first conference call between a first communication device and a plurality of communication devices, comprising the (1) displaying a calendar to identify a set of attributes of at least one conference call (2) scheduling and initiating a second conference call during the ongoing first conference call (3) displaying a participant status of each participant of the conference call; (4) displaying a conference call status of each ongoing conference calls, and a connection interface whereby a participant may selectively join an ongoing conference call; (5) displaying real time data pertaining to each participant of each conference call; and (6) initiating a chat session between at least two communication devices of the plurality of communication devices during the ongoing first conference call, and displaying a chat participant status on the at least two communication devices.

23 Claims, 35 Drawing Sheets

Related U.S. Application Data

(60) Provisional application No. 61/888,565, filed on Oct. 9, 2013, provisional application No. 61/888,569, filed on Oct. 9, 2013, provisional application No. 62/173,011, filed on Jun. 9, 2015.

(51) Int. Cl.
    *H04L 29/06*     (2006.01)
    *H04W 4/90*     (2018.01)
    *H04L 12/58*     (2006.01)
    *H04W 4/12*     (2009.01)
    *H04W 64/00*     (2009.01)
    *H04L 12/18*     (2006.01)
    *G06F 16/18*     (2019.01)

(52) U.S. Cl.
    CPC .......... *H04L 51/043* (2013.01); *H04L 65/403* (2013.01); *H04L 65/4015* (2013.01); *H04M 3/42195* (2013.01); *H04M 3/565* (2013.01); *H04M 3/567* (2013.01); *H04W 4/12* (2013.01); *H04W 4/90* (2018.02); *H04W 64/00* (2013.01); *H04L 51/046* (2013.01)

(58) Field of Classification Search
    USPC ........ 379/202.01, 205.01, 93.21, 158, 202.1; 455/566
    See application file for complete search history.

(56) References Cited

U.S. PATENT DOCUMENTS

| | | | |
|---|---|---|---|
| 7,729,684 B1 | 6/2010 | Straub | |
| 8,176,562 B1 | 5/2012 | Hernacki | |
| 8,320,875 B2 | 11/2012 | Musgrove | |
| 2002/0107930 A1 | 8/2002 | Itoh | |
| 2003/0105716 A1 | 6/2003 | Sutton | |
| 2004/0267707 A1 | 12/2004 | Hayes-Roth | |
| 2005/0044159 A1 | 2/2005 | Niemi | |
| 2005/0091289 A1 | 4/2005 | Shappell | |
| 2005/0181775 A1 | 8/2005 | Rideout | |
| 2008/0071868 A1* | 3/2008 | Arenburg | G06Q 10/107 709/206 |
| 2008/0140732 A1 | 6/2008 | Wilson | |
| 2009/0182833 A1 | 7/2009 | Balasubramanian | |
| 2009/0202060 A1* | 8/2009 | Kim | H04M 3/569 379/202.01 |
| 2010/0003949 A1 | 1/2010 | Ray | |
| 2010/0027775 A1* | 2/2010 | I'Anson | H04M 1/274575 379/202.01 |
| 2012/0054156 A1 | 3/2012 | Mason | |
| 2012/0089569 A1 | 4/2012 | Mason | |
| 2012/0128146 A1* | 5/2012 | Boss | H04M 3/56 379/202.01 |
| 2012/0321062 A1* | 12/2012 | Fitzsimmons | H04L 65/4015 379/142.17 |
| 2013/0017780 A1* | 1/2013 | Rose | H04W 4/16 455/41.1 |
| 2013/0122880 A1* | 5/2013 | Ali-Vehmas | H04W 4/16 455/416 |
| 2013/0173530 A1 | 7/2013 | Laron | |
| 2014/0351346 A1 | 11/2014 | Barton | |
| 2015/0065104 A1* | 3/2015 | White | H04M 3/565 455/416 |
| 2015/0081630 A1 | 3/2015 | Linsalata | |
| 2015/0120842 A1 | 4/2015 | Huggins | |

\* cited by examiner

SYSTEM AND METHOD TO IMPROVE MANAGEMENT DURING A CONFERENCE CALL

FIELD OF DISCLOSURE

The claimed system and method improve the ability of a user to manage operations during a conference call held on a mobile phone device. A processing device on the mobile phone device allows a user of said mobile phone device to execute operations which expand and improve the ability of a user to manage a conference call.

BRIEF DESCRIPTION OF RELATED ART

The modern business world is marked by state of the art conference call capabilities that enable people to connect with others across the globe via telephonic networks, cellular networks, and internet based voiceover IP technologies. However, in spite of features made available through modern technology, unsatisfied needs remain. For example, the organizer of a conference call often has to ascertain and distribute the number for the call as well as a PIN, which often serves as a means to authenticate members of the conference call. If a problem arises such that a participant is dropped from the call due to malfunctions or other issues with the existing technology, that participant must redial the call number and reenter the PIN. Despite these exertions, the participant is unavailable for the time period in which the call is dropped, and others are not notified of their colleague's absence.

Furthermore, there exists a need for a method to allow multiple conference calls to be conducted in parallel, and yet still permit the conference call participants to switch between conference calls. This must occur such that the conference call organizer can get question from one team on a first conference call and present the question to the second team on the second conference call, get answer from the second team and feed it back to the first team, without having to wait for days to coordinate this information exchange since all knowledgebase contained in expertize of key personnel can be accessed almost at the same time. This feature may be very crucial for time sensitive deliverables such as software products, finance related products and research and development in defense, national security and medicine, and the like.

In a conference call, there is a need for a way to make visible the status of each ongoing conference call and the connectivity status of each participant of said ongoing conference call to the conference call moderator and optionally to each participant of the conference call. Thus, a connected participant may be able to bridge in the disconnected participant without having the conference call moderator to join in the disconnected participant or having the disconnected participant to retrieve conference call login information, conference call authentication key etc. before re-dialing the conference call number and get connected to the conference call.

Further, a mechanism that can be employed to allow conference call participants to engage in an instant messaging session is desirable. Such a mechanism should provide an opportunity for example to management personnel to have a private discussion of critical issues, which may rightfully warrant privacy from the participants who may be subject matter of that discussion.

A way is needed for a conference call organizer to designate other individual participants as moderators, and subsequently hand over the control of the conference call to the designated moderator.

Further, in a conference participants may have a need to exchange data during the conference call to further the objectives of the conference call. Likewise, conference call participants may have the need to check availability of the conference call participants before scheduling a next conference call or check the company schedule to see what other conference calls are scheduled in the next week to avoid conflicts, in addition to better managing company resources and human resources. The present invention satisfies these and other needs and provides further related advantages.

SUMMARY OF THE INVENTION

A method for managing operations during a first conference call between a first communication device and a plurality of communication devices, comprising the (1) displaying a calendar to identify a set of attributes of at least one conference call (2) scheduling and initiating a second conference call during the ongoing first conference call (3) displaying a participant status of each participant of the conference call; (4) displaying a conference call status of each ongoing conference calls, and a connection interface whereby a participant may selectively join an ongoing conference call; (5) displaying real time data pertaining to each participant of each conference call; and (6) initiating a chat session between at least two communication devices of the plurality of communication devices during the ongoing first conference call, and displaying a chat participant status on the at least two communication devices.

DETAILED DESCRIPTION OF THE INVENTION

Figure 1:
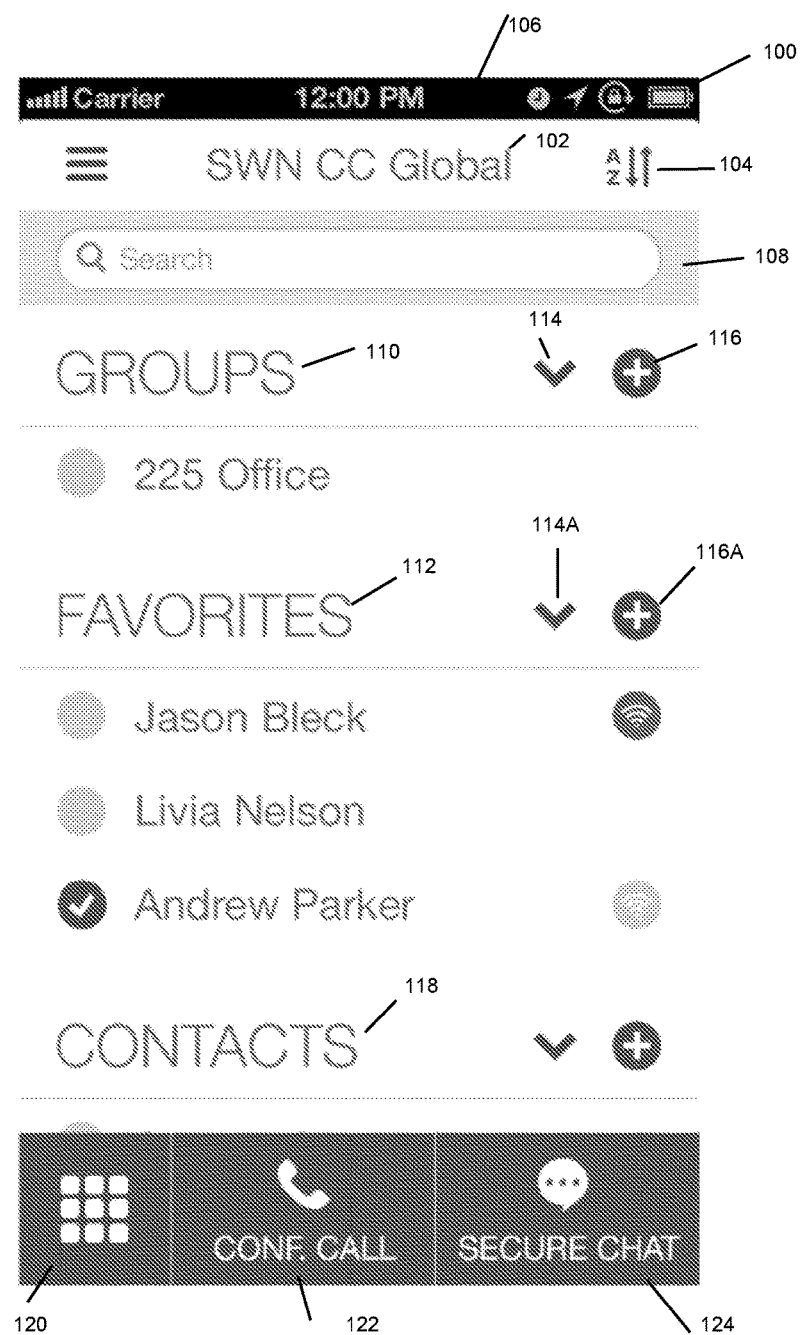
FIG. 1 represents an interface showing a list of contacts organized into groups and favorites.

A method for non-transitory computer readable medium containing computer instructions configured to operate with electronic computer hardware to manage operations during a first conference call between a first communication device and a plurality of communication devices, comprising the following steps: displaying, in real time, a calendar on a display of each of the plurality of communication devices to identify a set of attributes of at least one conference call; scheduling and initiating a second conference call during the ongoing first conference call, and connecting a participant in the first conference call to the second conference call while the first conference call is in progress; displaying, in real time, a participant status of each participant of the conference call on a display of each of the plurality of communication devices; displaying, in real time, a conference call status of each ongoing conference call, and a connection interface whereby a participant may selectively join an ongoing conference call; displaying real time data pertaining to each participant of each conference call on the display of each of the plurality of communication devices; and initiating, in real time, a chat session between at least two communication devices of the plurality of communication devices during the ongoing first conference call, and displaying a chat participant status on the at least two communication devices in real time.

The disclosed method further comprising the steps of initiating a third conference call during the ongoing first conference call and the second conference call, and connecting a selected group of participants in the first conference call and the second conference call to the third conference call while the first conference call and the second conference call are in progress. Furthermore, the disclosed method further comprises the steps of initiating a third conference call during the ongoing first conference call and the second conference call, and connecting each participant in the first conference call and the second conference call to the third conference call while the first conference call and the second conference call are in progress.

The set of attributes may comprise the conference call date, the conference call time, the conference call duration, and a list of conference call participants. The step of displaying a participant status of each participant of the conference call may further comprise the steps of displaying, for each participant connected to the conference call, a connected status on a display of each of the plurality of communication devices; and displaying, for each participant disconnected from the conference call, a not-connected status on a display of each of the plurality of communication devices.

The disclosed method may comprise the steps of initiating an outgoing call to establish a communication link with a disconnected participant, displaying the conference call status of each ongoing conference call on the display of each of the plurality of communication devices, receiving a selection a specific conference call from a participant, and joining the participant in the selected conference call, providing a media sharing interface to the conference call participants to share media files with another participant of the conference call in real time. wherein the media sharing interface is a touch screen number pad.

The disclosed method may comprise the steps of providing a re-connection interface for a conference call participant to establish a communication link with a participant who had previously established and subsequently lost a connection to the conference call, wherein the re-connection interface is a touch screen number pad.

The aforementioned operations require complex operations performed by a processing device on a mobile phone device. Sharing of audio and photographic file data requires dependence on a microphone, speaker, touch screen, and a camera on a mobile phone device. The processing device on the mobile phone device allows the operations and features of the claimed system and method.

The claimed system and method include a conference call application. Current providers of conference call features charge a burdensome expense on users. The claimed application helps users take advantage of unforeseen improvements in the industry. Up to 2,000 customers may use said application. Customers pay a low monthly flat fee. The fee may be semi-annual as well.

The claimed system and method allows a user to choose participants for a conference call and call said participants while in a conference call. The system and method allows sharing of one or more video files. The system and method allows the archiving and recording of audio produced during a call. The system and method also allows an on-net data channel as opposed to limiting itself to traditional phone connectivity.

The claim system and method includes a directory which a user may search in order to retrieve content. The system and method also permits exchanging file data from mobile phone to mobile phone. One or more different types of media can contain said file data. Another novel part of the claimed system and method is its auto-redial feature. If a participant drops from a conference call the claimed system and method will permit a user to dial said participant, enabling said participating to re-join said conference call.

The claimed system and method reduces the currently-present friction associated with managing conference calls. Initially the claimed smartphone application will be available on an iPhone yet the capability is present for said application to become available on all platforms.

FIG. 1 represents an interface 100 showing a list of contacts organized into groups and favorites. The interface 100 may depict a header 106 and a logo 102. Further, the interface 100 may display a listing of contacts 118 wherein the contacts may be organized into a groups tab 110 and a favorites tab 112. A user may select option 114 and 114A to view details of the groups tab 110 and the favorites tab 112 respectively. Similarly, a user may select option 116 and 116A to add a new instance of group or a new instance of favorites respectively. Via a search option 108, a user may search a person, a phone number, an email address or other similar information in the groups tab 110, the favorites tab 112, and the contacts tab 118. By selecting option 104 a user may alphabetically sort the groups displayed in the groups tab 110, the favorites displayed in the favorites tab 112 and the contacts displayed in the contacts tab 118. Additionally, as shown on the interface 100, a user may manually initiate a call, initiate a conference call or start a secure chat by selecting a keyboard option 120, a conference call option 122 and a secure chat option 124 respectively.

Figure 2:
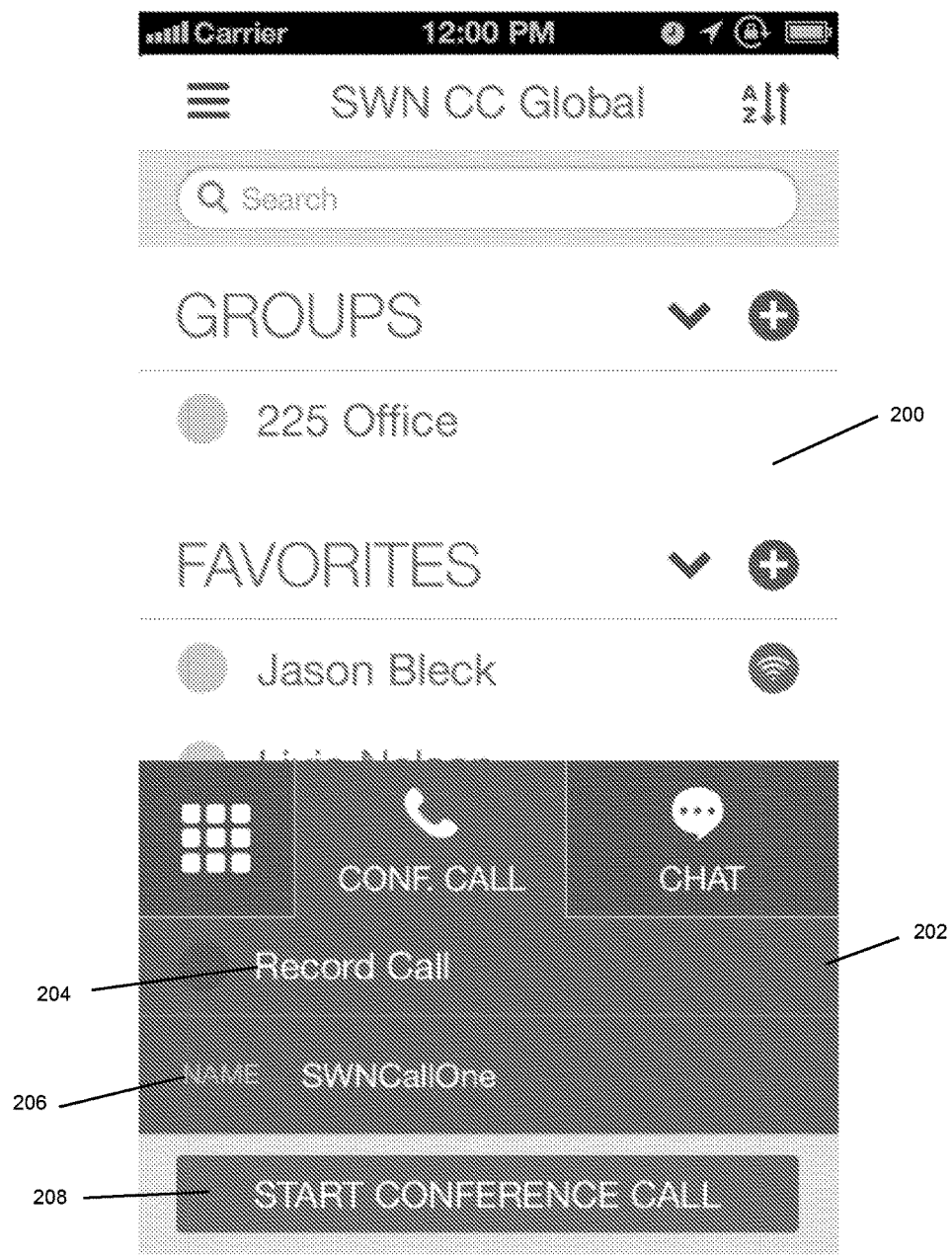
FIG. 2 represents the ability of a user to start a conference call.

FIG. 2 represents interface 200 resulting from a user selecting option 122 on the interface 100 shown in FIG. 1. The interface 200 indicates a display area 202, where a user may start a conference call by selecting at least one group or at least one favorites on the interface 200. A user may then select a start conference call option 208 and may optionally record the conference call by selecting a record call option 204 after specifying a name 206 for the conference call to identify the conference call for the recording purposes.

Figure 3:
FIG. 3 represents the ability of a user to start a chat.

FIG. 3 displays an interface 300 resulting from a user selecting the secure chat option 124 on the interface 100 shown in FIG. 1. The interface 300 indicates a display area 302, where a user may select at least one group or at least one favorites on the interface 300. A user may then start a secure chat with the selected group or favorites by selecting a start secure chat option 308 after specifying a name 306 for the chat.

Figure 4:
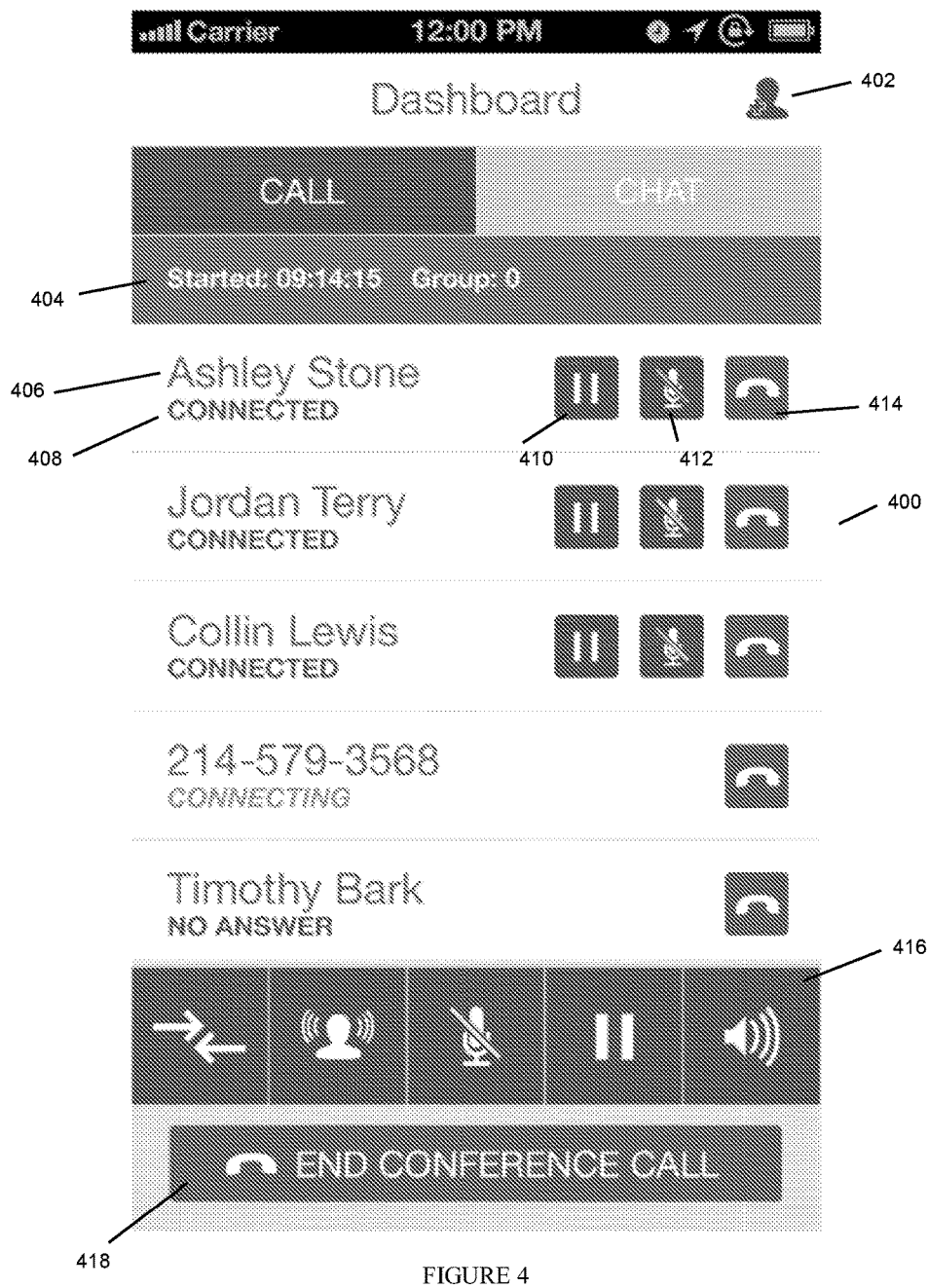
FIG. 4 illustrates a list of all participants in a particular conference call.

FIG. 4 illustrates a list of all participants in a particular conference call. FIG. 4 displays an interface 400 resulting from a user selecting the conference call option 122 on the interface 100 shown in FIG. 1. The interface 400 indicates a dashboard display area 402, where a user may select a call option or a chat option. As seen on the interface 400 upon selecting call option the call information 404 is displayed on the interface 400. The call information 104 may comprise information pertaining to the call such as call start time, call participant group identification, and the like. The names of the participants 406 along with a status 408 of each call participant may also be displayed on the interface 400. The status 406 may indicate whether a participant is connected, in the process of establishing a communication link with the caller, cannot be reached, or does not answer the call.

Notably, status of a given participant may be updated dynamically in the real time, and can be viewed by all the participants to the conference call. In one embodiment of the disclosed invention, only a conference call initiating party may be able to view the connection status of the given participant. In another embodiment of the disclosed invention, the system may detect a participant being disconnected from an ongoing call and automatically redial the number of the disconnected participant and optionally present a visual indication to the call initiating party.

Call initiating party may configure voice settings for each participant such as place a participant on hold by selecting pause option 410, mute a participant by selecting mute option 412, or hang up on a participant by selecting disconnect option 414. A call option area 416 on the interface 400 may indicate several options such as mute, volume increase, pause, speaker, and call switch options, whereby call initiating party may place the ongoing conference call on mute, change the ongoing call volume, pause the ongoing conference call or place the ongoing conference call in a speaker mode. Call initiating party may select the options in the call option area 416 to manage the conference call. Call initiating party may select end conference call option 418 to conclude the conference call.

Figure 5:
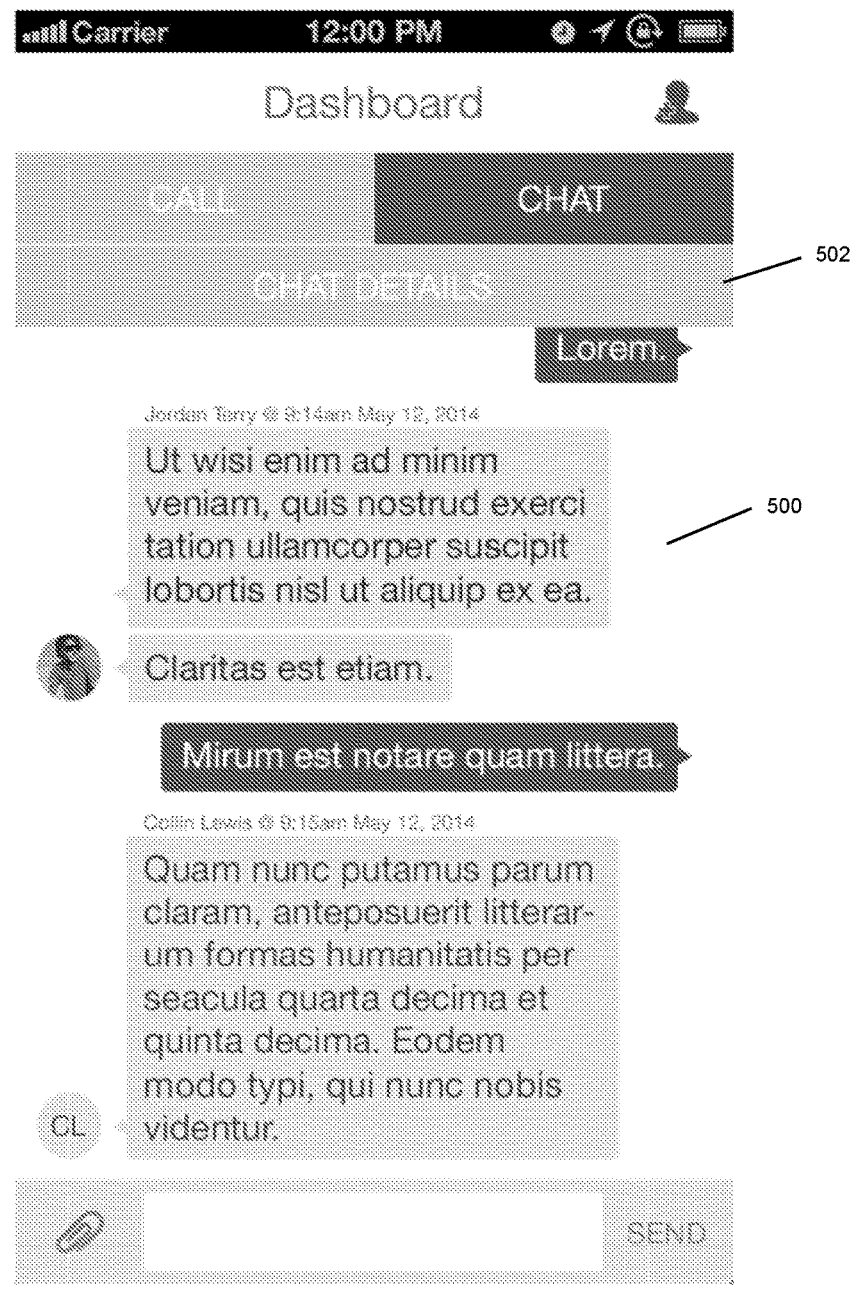
FIG. 5 illustrates a chat session between participants of a conference call.
Figure 6:
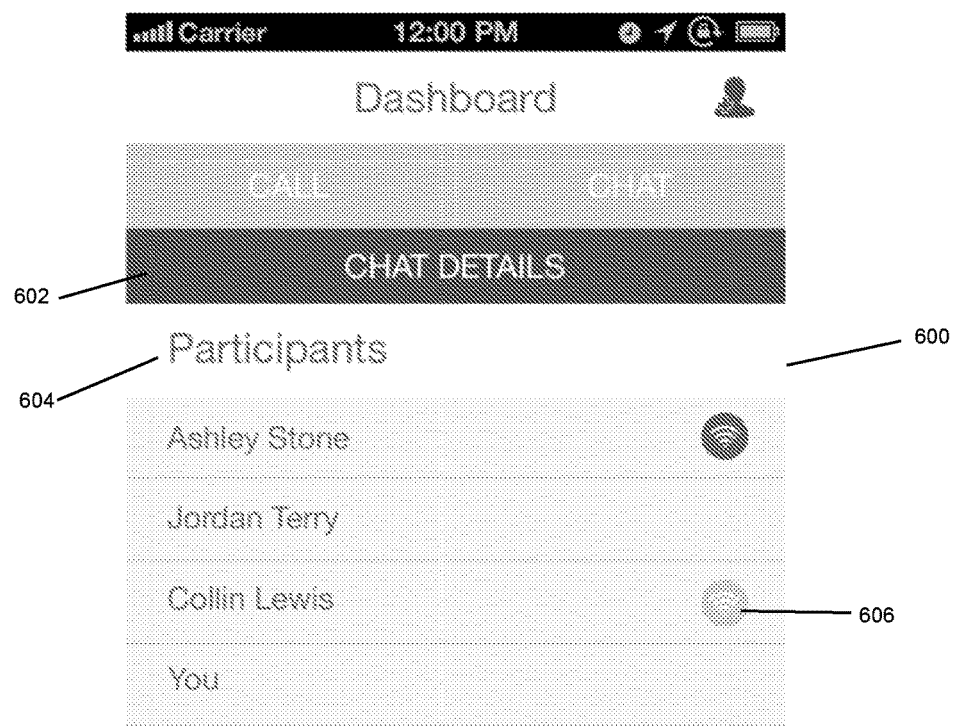
FIG. 6 represents a list of participants in a chat session.

FIG. 5 illustrates interface 500 showing a chat session between participants of a conference call. FIG. 6 represents interface 600 showing chat details 602 of a chat session. For example, a list of names of the participants in a chat session 604 and a connectivity indicator of each participant in the chat session 606 may be displayed on the interface 600.

Figure 7:
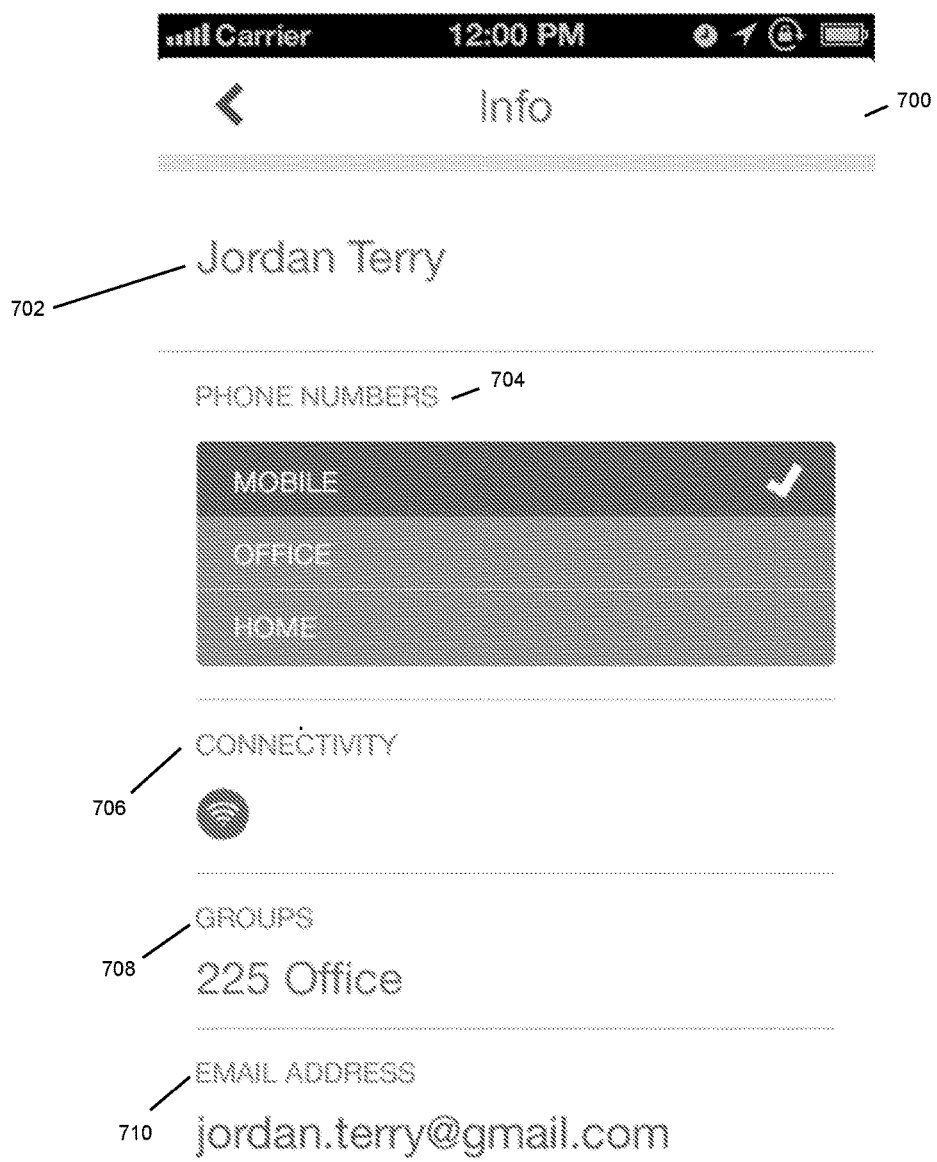
FIG. 7 represents a display of information of a contact.

FIG. 7 represents interface 700 displayed upon selecting the participant 608 on the interface 600. The interface 700 may display information such as a name 702 of a contact, phone numbers 704 of a contact, a connectivity status 706 of a contact, groups to which the selected contact belongs to 708, email address 710 of a contact, and the like.

Figure 8:
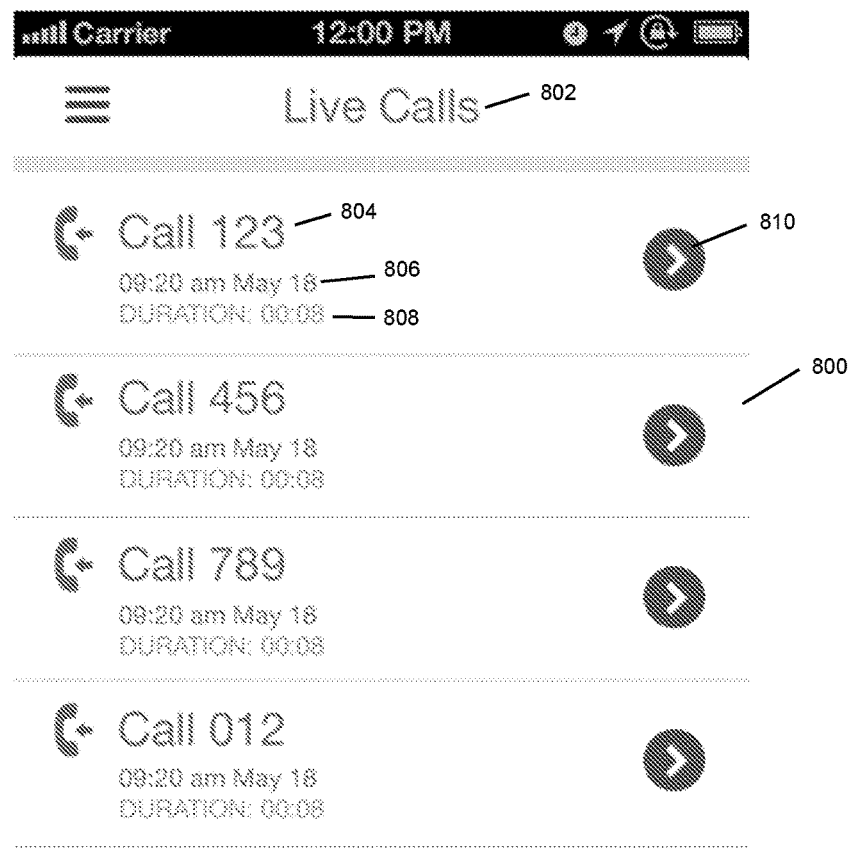
FIG. 8 represents a list of live calls with time, date, and duration included as details.
Figure 9:
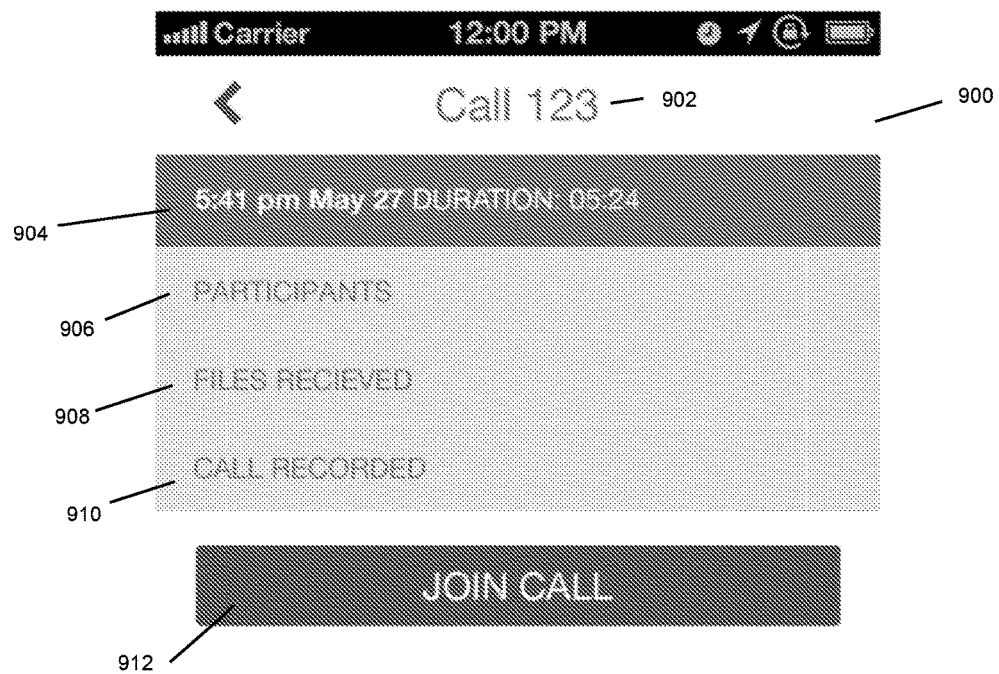
FIG. 9 represents an option which allows a user to select a particular call from the Live Calls menu and view additional details about said particular call.

FIG. 8 represents interface 800 displaying a list of live calls 802 that are currently taking place as the interface 800 is being displayed. For each live call the interface 800 may display a call identification number 804, a call time and date 806, call duration 808 and call details display option 810. Interface 900 shown in FIG. 9 is displayed when call details display option 810 is selected. In other words, a user can select a particular call from the live calls menu to view additional details about the selected call.

Turning now to FIG. 9, where the interface 900 represents information pertaining to a selected call, for example a call identification number 902, call time, date, and duration 904, names of the call participants 906, files received during the call 908, and call recording indicator 910. By selecting a join call option 912, a user can join the selected call.

Figure 10:
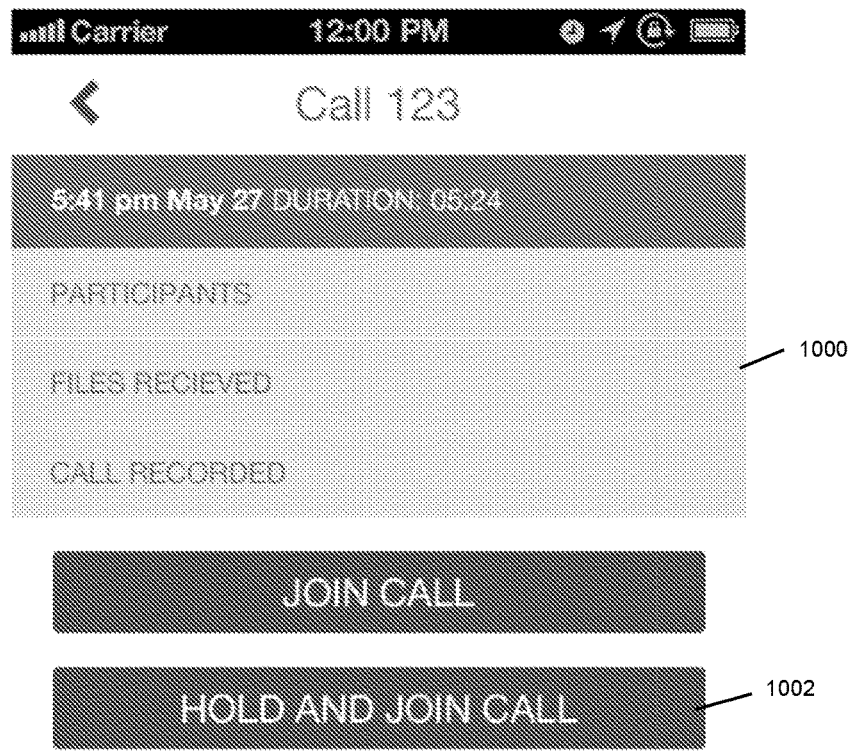
FIG. 10 demonstrates the addition of a "Hold and Join Call" in addition to the drill-down menu displayed in FIG. 9.

Similarly, FIG. 10 demonstrates the addition of a "Hold and Join Call" option 1002 on the interface 1000 in addition to the menu displayed on the interface 900 in FIG. 9. This option may be used to hold and ongoing conference call and join a new conference call.

Figure 11:
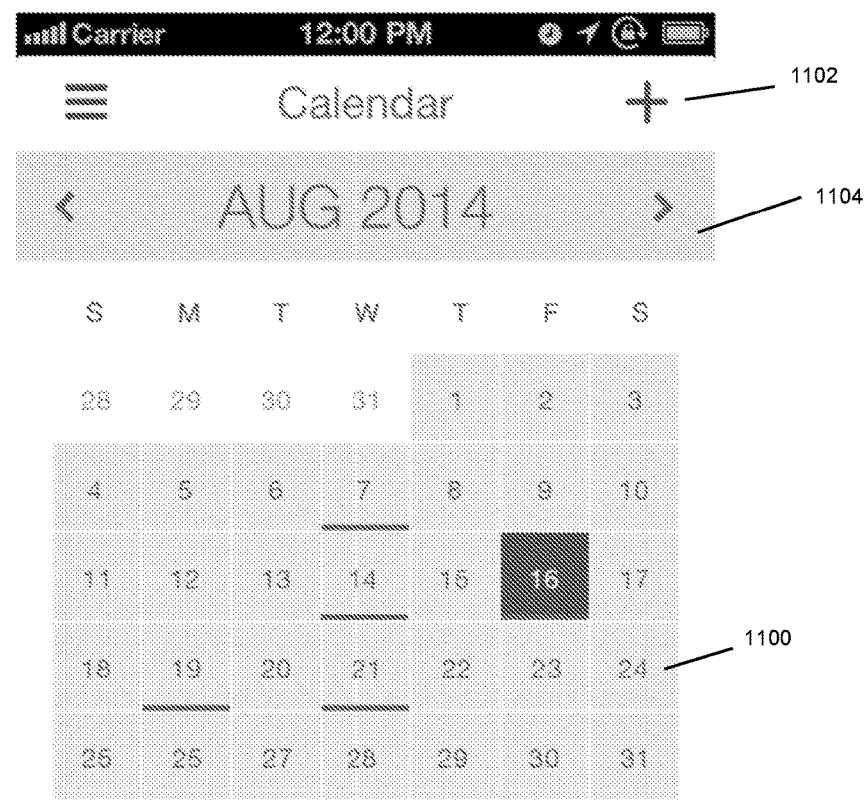
FIGS. 11-13 demonstrate a calendar feature which allows a user to schedule a future conference call.
Figure 12:
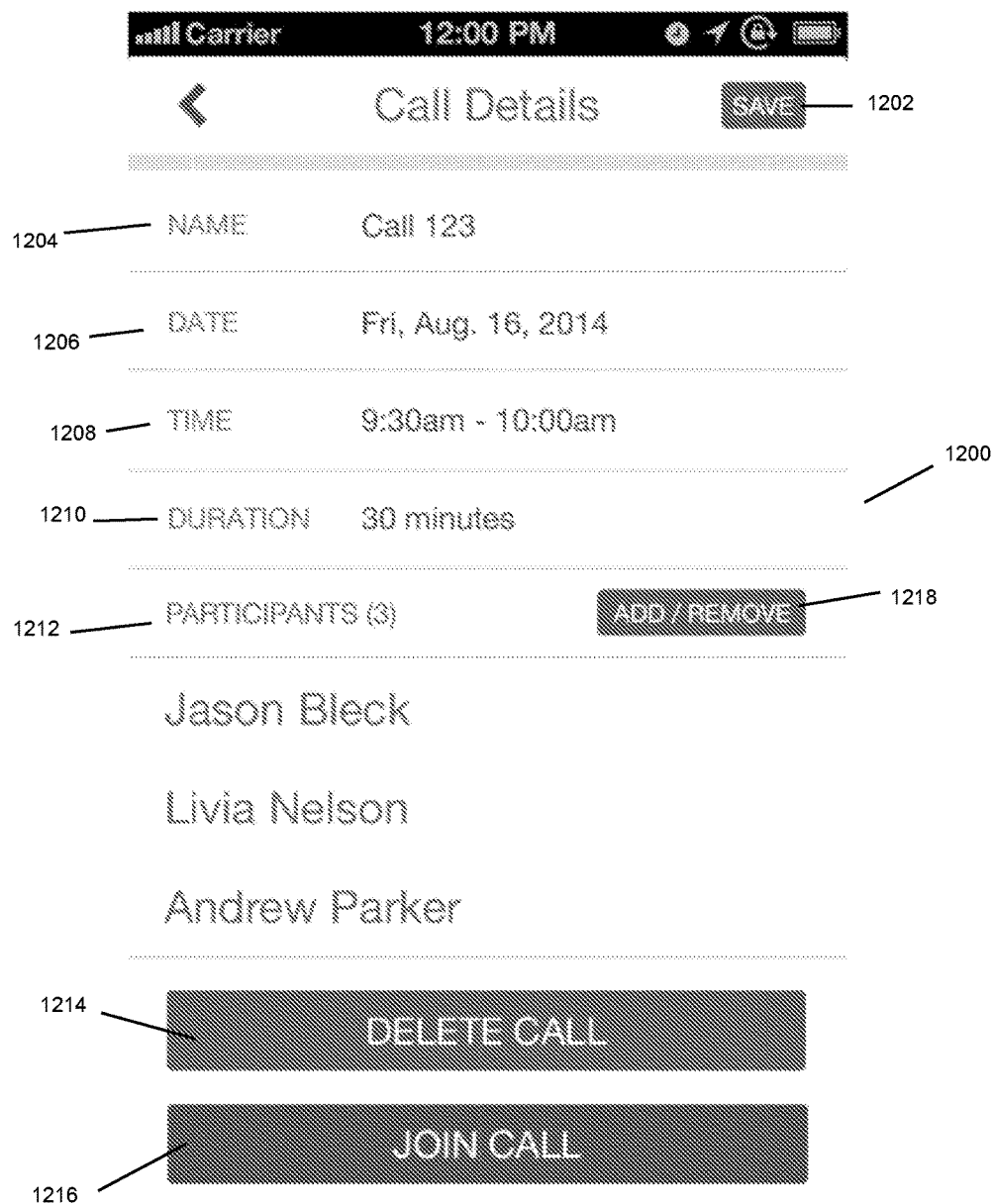
Figure 13:

FIGS. 11-13 demonstrate a calendar feature which allows a user to schedule a future conference call. In FIG. 11, an interface 1100 shows a calendar view indicating a month 1104 showing days of the month wherein the days on which a conference call is scheduled are marked by an indicator such as underlining, boldface and the like. Upon a user selecting a specific day a list of calls 1106 that are scheduled on the selected day is displayed on the interface 1100. A user may schedule a new call to a selected day of the displayed month by selecting an add event option 1102 on the interface, this phenomenon is further described in conjunction with FIG. 13.

Referring now to FIG. 12, where an interface 1200 shows the call details such as a name of the call 1204, a date of the call 1206, a time of the call 1208, a duration of the call 1210, and a list of names of the call participants 1212. A user may, by selecting option/add remove participants 1218, add or delete the participants from the call. After making the changes i.e. after adding or deleting the participants, a user may select a save changes option 1202 to save the previously made changes to the list of call participants. A user may select to delete call by selecting option delete call option 1214 or a user may select to join the call by selecting a join call 1216.

Turning now to FIG. 13, as described above, a user may schedule a new call to a selected day of the displayed month by selecting an add event option. For example, after selecting the add event option 1102 on the interface 1100, interface 1300 may be displayed. A user may select an event name 1312, an event date 1302, an event time 1310 for a call a user is seeking to add. Additionally, a user may add or remove participants by selecting option 1304. A user may select a save option 1306 to save the changes, or a cancel option 1308 to cancel the changes made via the interface 1300.

Figure 14:
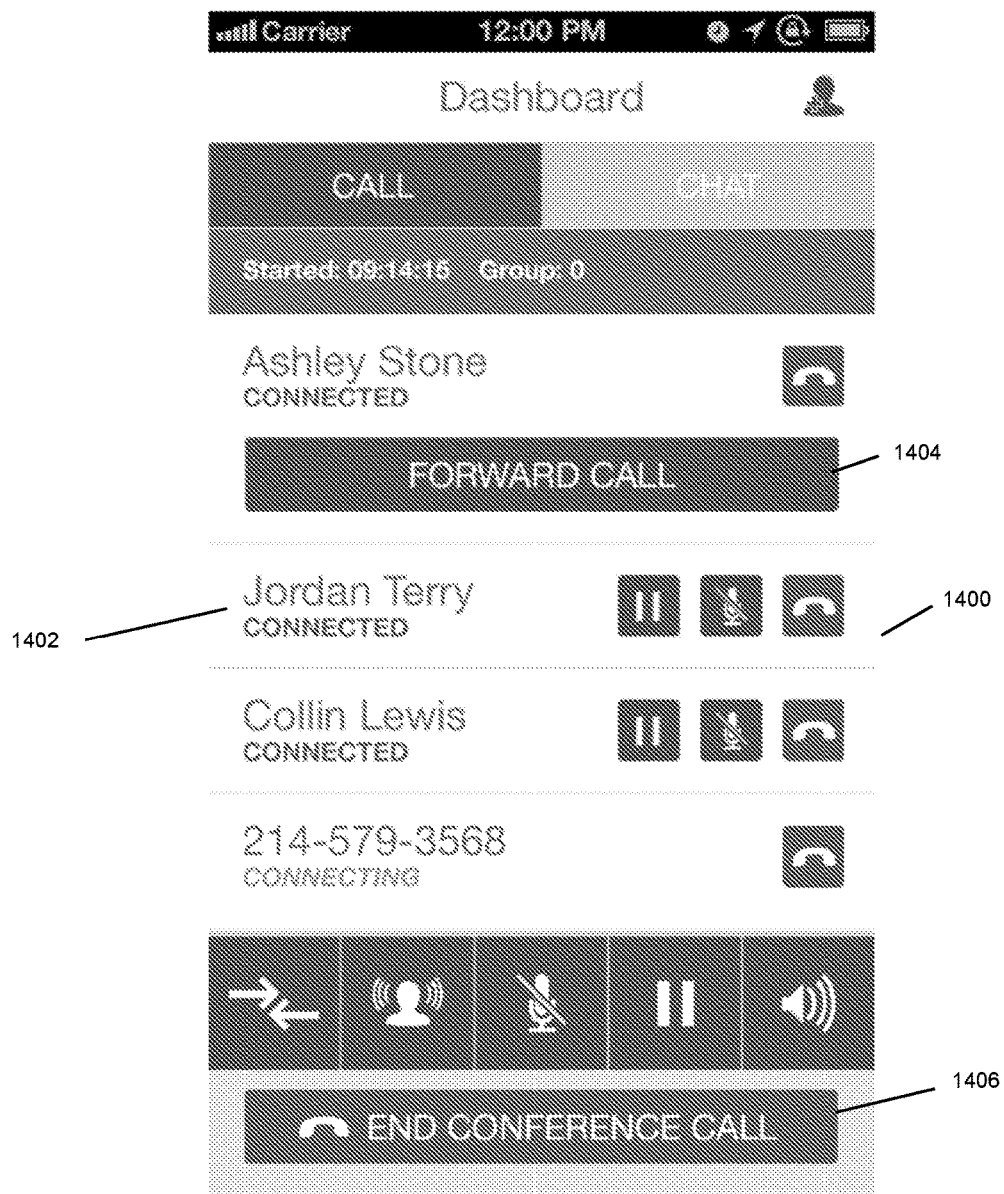
FIG. 14 displays a dashboard interface available to a user while conducting a conference call.

FIG. 14 displays an interface 1400 showing a dashboard view available to a user while conducting a conference call. A list of call participants 1402 along with the connection status of each participant may be displayed on the interface 1400. A user may select to forward the conference by selecting a forward call option 1404, which may cause the display of an interface 1500 shown in FIG. 15. Alternatively, a user may end the conference call by selecting an end conference call option 1406.

Figure 15:
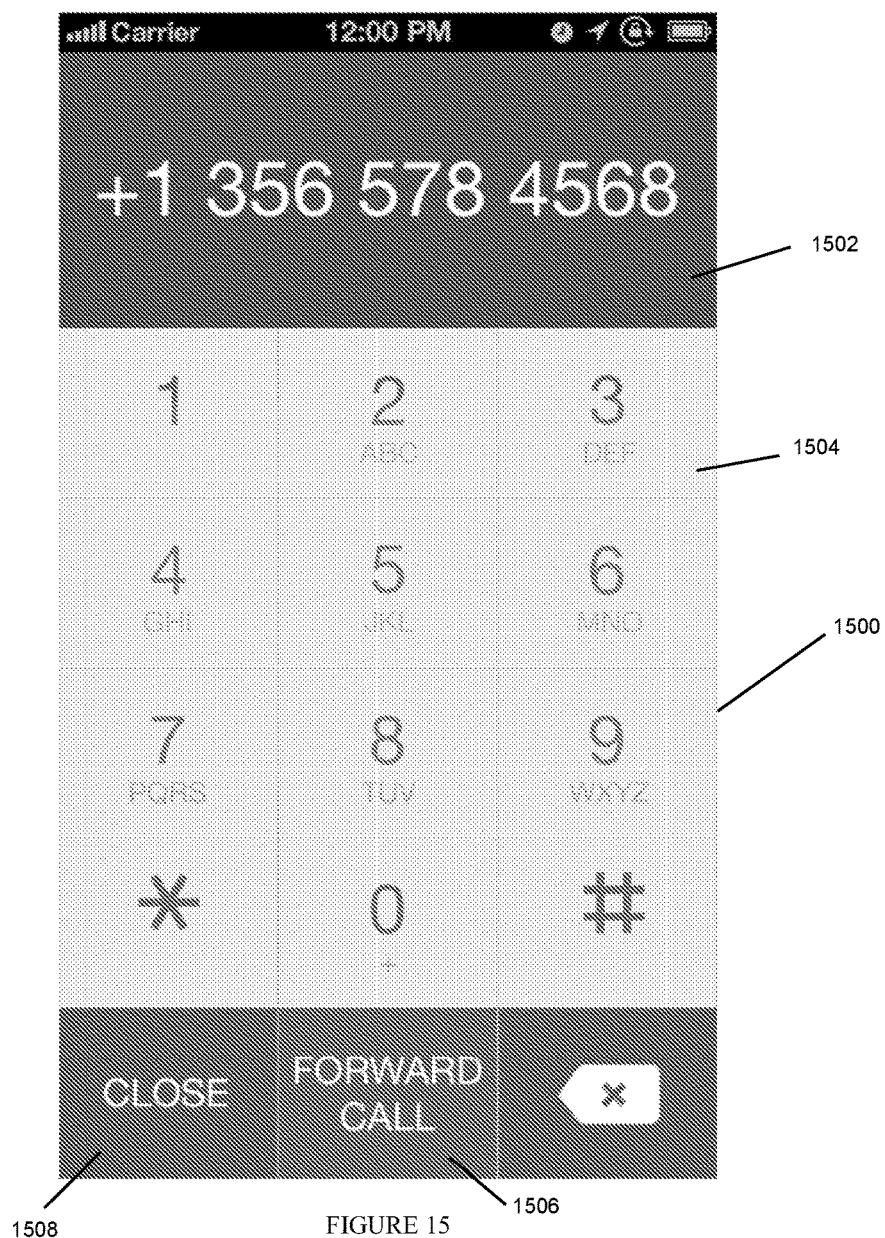
FIG. 15 demonstrate how a user can dial a number in order to add said number to a call.

FIG. 15 demonstrate how a user can dial a number of a recipient in order to add the recipient to a call or forward a call to a user available at dialed number. FIG. 15 shows an interface 1500 wherein, a user can dial a number 1502 via a keypad 1504 and select a forward call option 1506 to add a recipient to an ongoing conference call. Alternatively, a user may abort the attempt of adding a new recipient by selecting a close option 1508 and to return to the interface 1400 shown in FIG. 14.

Figure 16:
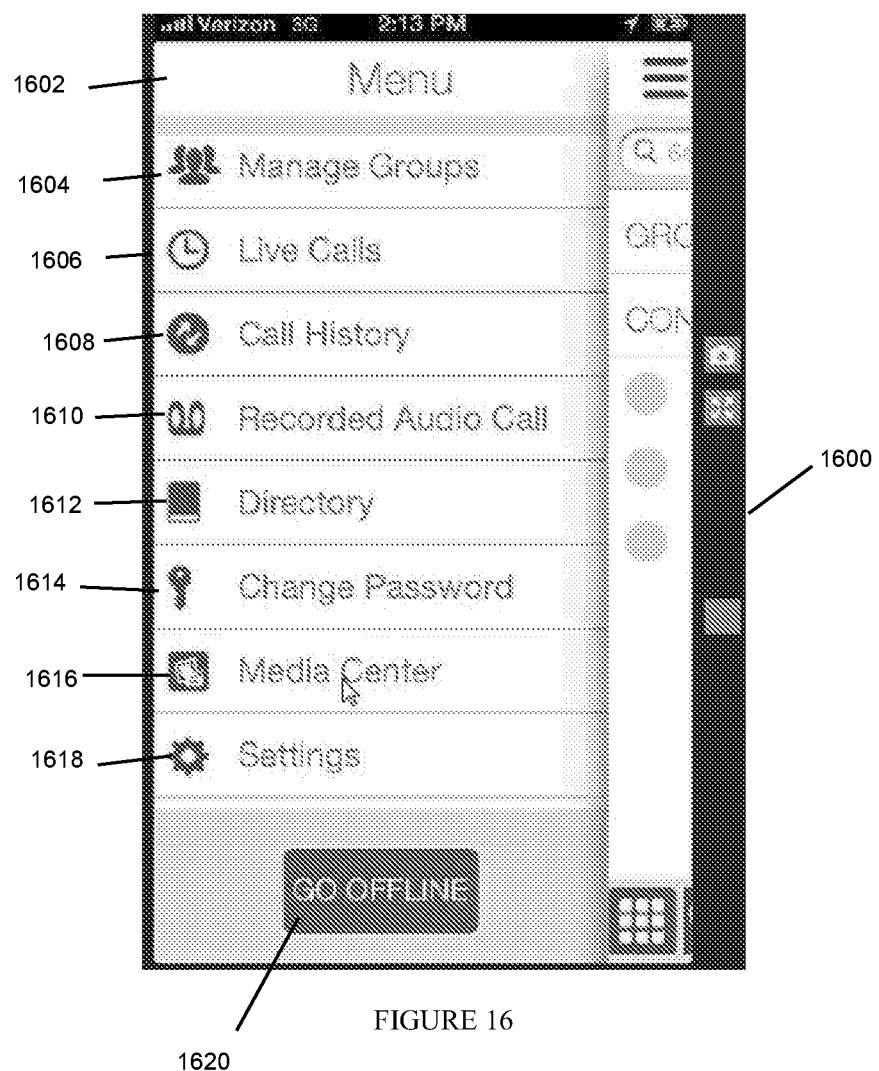
FIG. 16 displays an interface showing a home screen menu displaying several options to a user.

Whereas FIGS. 1-3 display contacts, found on a device of a user and which the application may import, FIG. 16 displays an interface 1600 showing a home screen menu displaying several options to a user. The claimed system and method prompt a user to indicate whether said user wishes to import contacts from the device into the application. The claimed system and method allows a user to send a conference call invitation to an on-device contact.

FIG. 16 also features a menu 1602 listing several options for the user on the interface 1600. For example, by selecting a manage groups option 1604, a user to edit a group of contacts, add a contact to a group, or delete a contact from a group. Similarly, by selecting a live calls option 1606 a user may cause a display of a listing of active conference calls. An active conference call includes a call which has featured an invitation to a user. In case a user gets disconnected said user can select the live calls option 1606 to return to a call.

Figure 17:
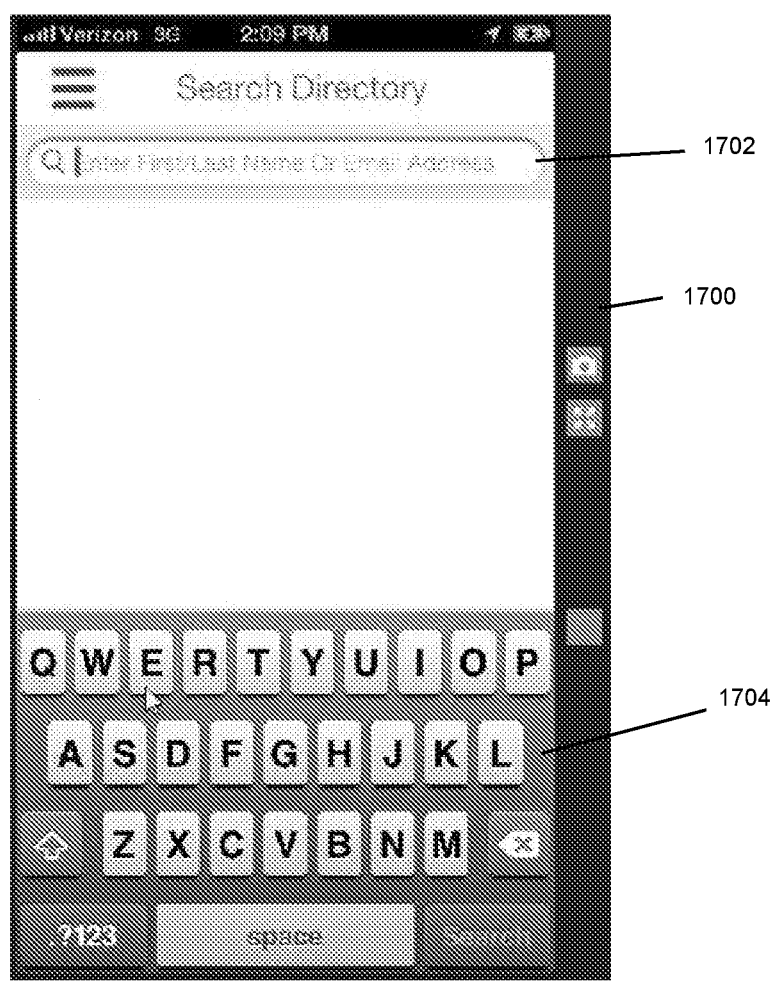
FIG. 17 displays an interface showing a search box whereby a user can search for contacts.
Figure 18:
FIG. 18 displays an add contact interface whereby a user can add a contact to the user's contact list.
Figure 19:
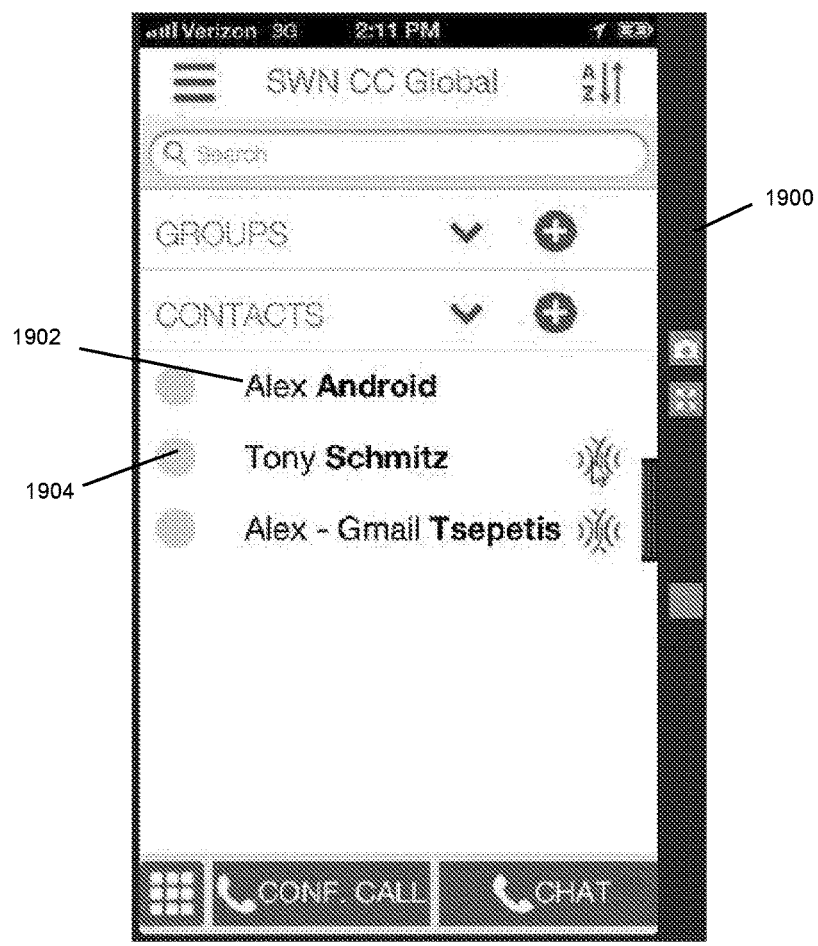
FIG. 19 indicates an interface displaying a list of contacts, comprising a contact name and a contact connection status indicator.

Likewise, selecting a call history option 1608 may prompt the claimed system and method to display a log of all outbound calls a user has made or inbound calls a user has received. The call history option 1608 option may enable a user to reconstitute a call in case said user wanted to restart a preexisting call. Via the recorded audio call option a user may record a conference call that is in progress or that is previously started and store a recording of said conference call in a directory. By selecting a directory option 1612 a user may access the directory containing names of other users who has the disclosed application installed on their device. This process is indicated in FIGS. 17-19. A user can change a password by selecting a change password option 1614. A user may access the media center and configure settings via options 1616 and 1618 respectively. An interface 2000 shown in FIG. 20 may be displayed upon a user selecting the media center option 1616. Alternatively, a user may select go offline option 1620 to exit from the disclosed application.

FIG. 17 displays an interface 1700 showing a search box 1702 whereby a user can search for contacts who have said application installed on a mobile device. A user may enter a search criterion in the input area 1702 via keyboard 1704. The disclosed method and system may search for the search term in a search directory containing information pertaining to contacts who have said application installed on a mobile device. The search function is described in further detail in conjunction with FIG. 18

Now turning to FIG. 18, where for example, a search is conducted by providing a string "Tony" in the input area 1802 on an interface 1800. The disclosed system and method may conduct a search in the search directory and provide a result 1804 on the interface 1800. The disclosed system may use a repository 3580 shown in and further discussed in conjunction with FIG. 35 to locate the searched contact. The user initiating the search may select to add the searched contact to the user's contact list by selecting an add option 1806 or alternatively discard the searched information by selecting a cancel option 1808. Accordingly, the application may enable a user to search for and add contacts from the directory.

FIG. 19 indicates an interface 1900 displaying a list of contacts, comprising a contact name 1902 and a contact connection status indicator 1904, indicating if the contact indicates is online or offline. In one embodiment of the disclosed invention, an online a green indication may indicate that the contact has installed the application on the contact's device, and the contact is available at the time of the display of said green indication. Conversely, an online gray indication may indicate that the contact has the application installed on the contact's device but the contact is not available at the time of the display of the gray indication.

Figure 20:
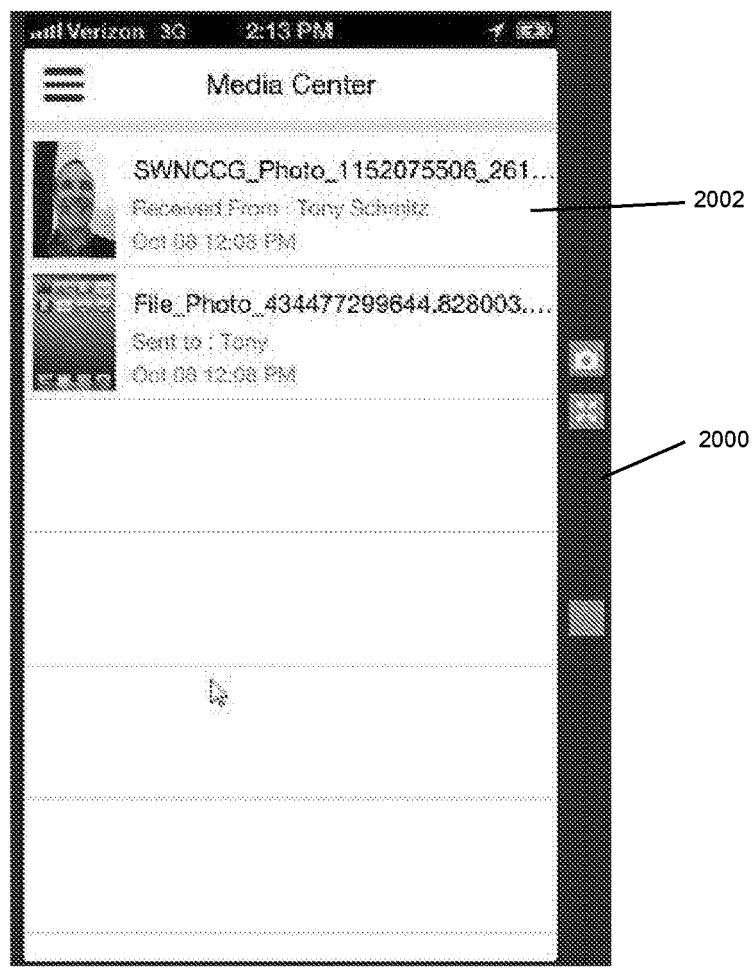
FIG. 20 illustrates media center interface according to a preferred embodiment of the disclosed invention.

Referring now to FIG. 20 displaying a media center interface 2000 resulting from a user selecting the media center option 1616 in FIG. 16. File data may comprise media files including but not limited to Blu-ray, CD, DVD, memory stick, USB flash drive, and the like. File data of a user maybe stored in a media center of the user's communication device. File data received from another contact may also be stored in the media center of the user's communication device. By selecting the media center option a user may exchange file data from the user's communication device. In other words, a user may send file data to another contact by selecting the media center option. Similarly, a user may receive file data from another contact by selecting the media center option and store the received file data in the media center of the user's communication device. Likewise, using the media center option an organizer or a conference call initiating entity may be able to exchange file data with other participants of the conference call during an ongoing conference call.

Figure 21:
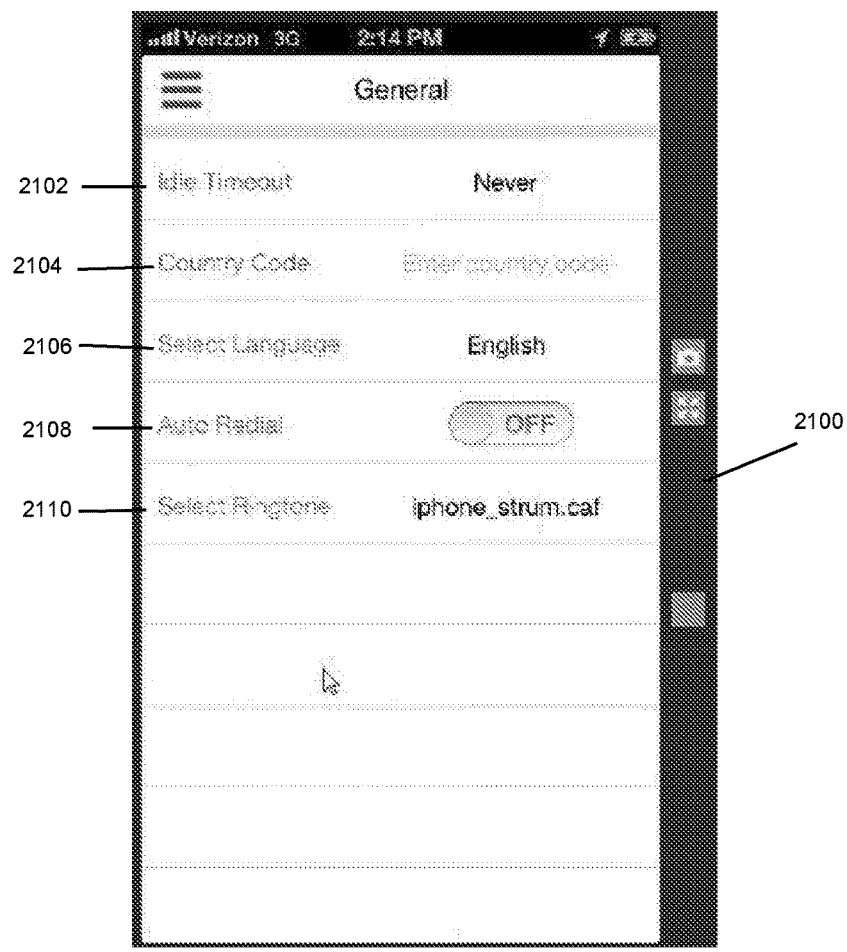
FIG. 21 depicts a configuration interface according to a preferred embodiment of the disclosed invention.

FIG. 21 shows a configuration interface 2100 resulting from a user selecting the settings option 1618 in FIG. 16. Selecting the settings option allows a user to change settings such as an idle timeout setting 2102, a country code setting 2104, a language setting 2106, an auto redial setting 2108 and a ringtone setting 2110. Notably, activation of an auto-redial feature can be advantageous to a user since the auto-redial feature may enable an organizer to dial a phone number representing a user that has dropped from an ongoing conference call.

Figure 22:
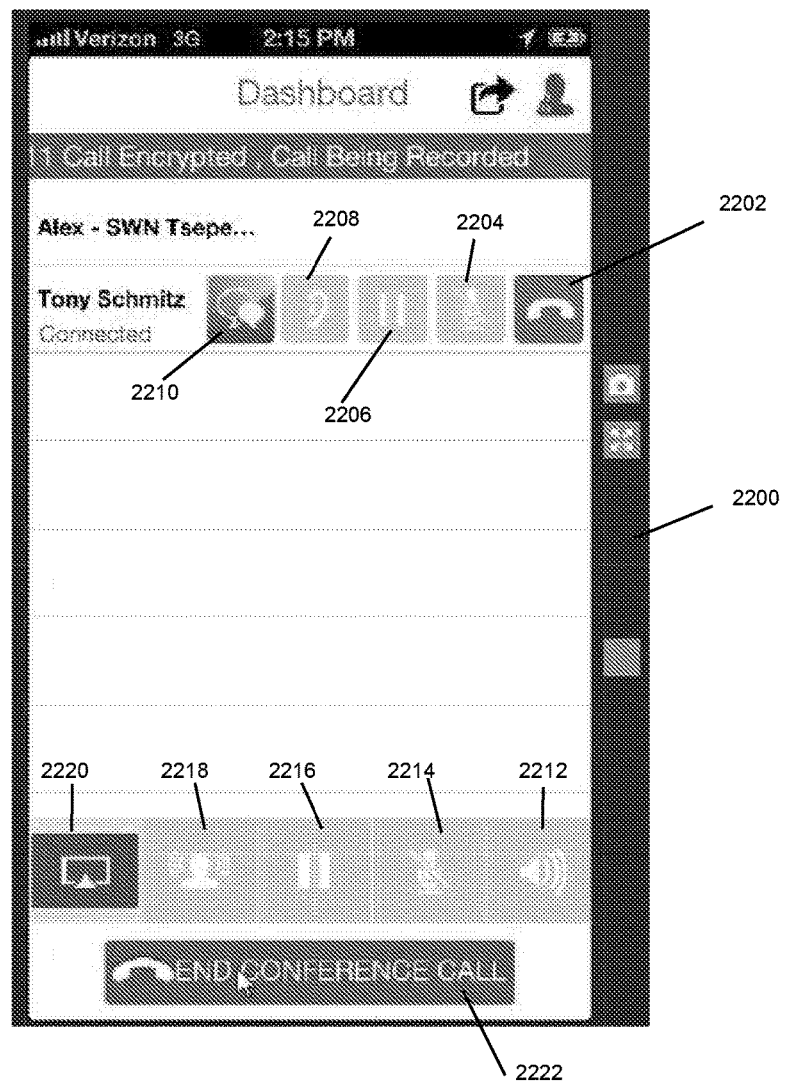
FIG. 22 illustrates dashboard interface according to a preferred embodiment of the disclosed invention.

Selecting a contact may enable a user to initiate a conference call as shown in FIG. 22, which illustrates the options available for a user when interacting with a contact. A user may select a phone icon 2202 which would boot a participant from a conference call. The user may select a microphone icon 2204 to mute a participant on a conference call. The user may select a pause icon 2208 to put a participant on hold. The user may select an ear icon 2208 to enable said user to have a private conversation with a participant—a "whisper" with a participant in the midst of a conference call. A text icon 2210 represents the ability of a user to engage in a text message conversation with a participant.

Figure 32:
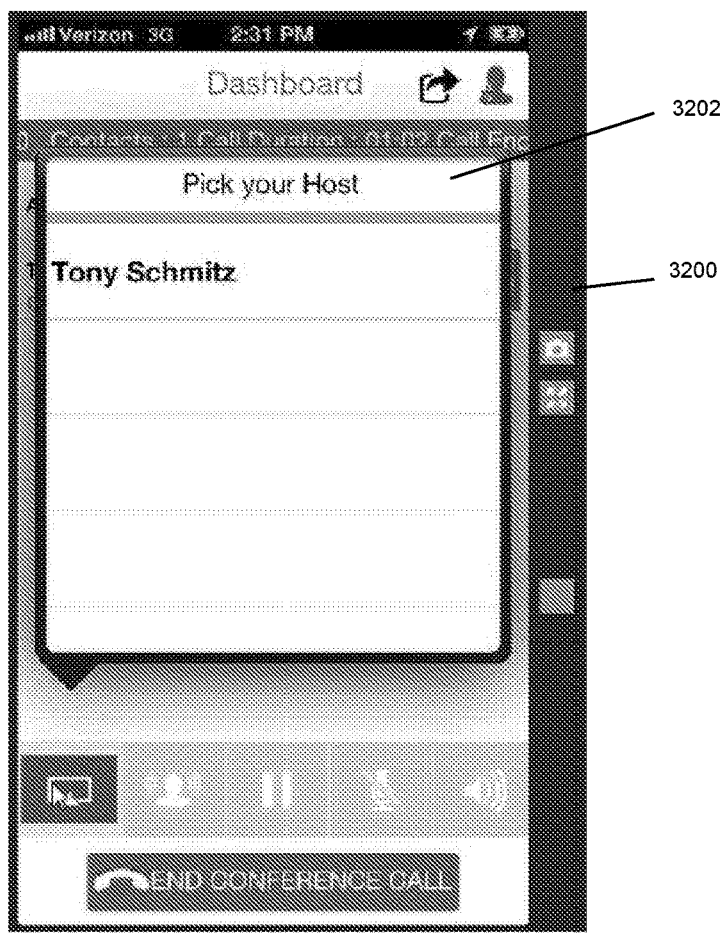
FIG. 32 demonstrates a host transfer capabilities of the disclosed invention.

By selecting a speakerphone option 2212, a user may place an ongoing conference call on speakerphone. The microphone 2214 allows a user to mute the microphone of the user. The pause icon 2216 allows a user to put all participants in an ongoing conference call on hold. The 2218 option allows a user to mute all participants, thereby enabling a "broadcast" type of call wherein only the user is able to be heard. The icon 2220 represents an option which allows a user to swap control of a conference between an organizer and a participant. This control swap feature is further described in conjunction with FIG. 32. Finally, the user may conclude the ongoing conference call be selecting end conference call option 2222.

Figure 23:
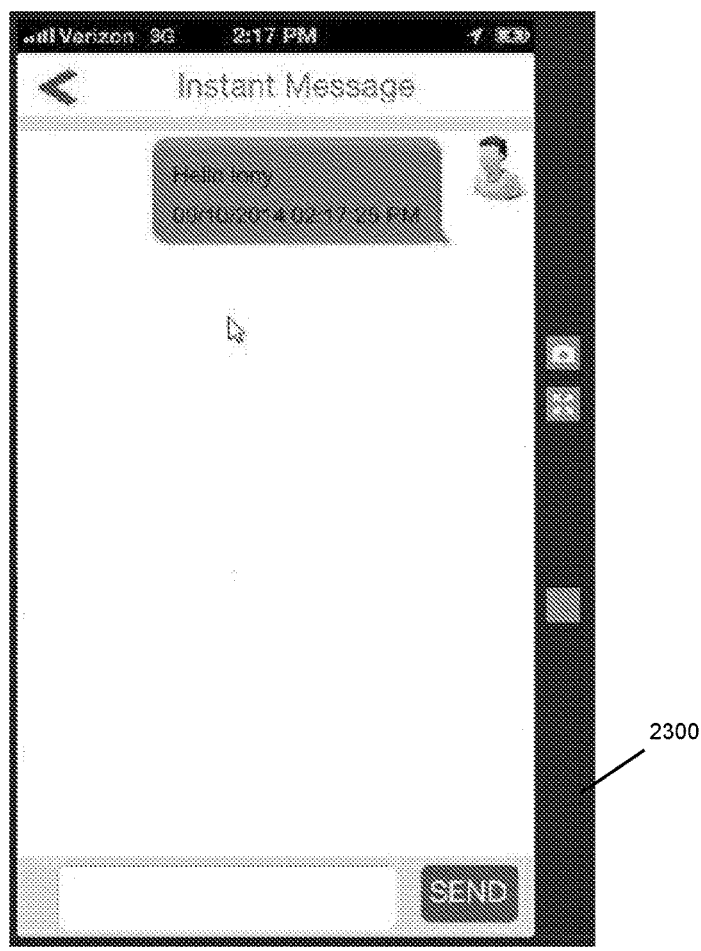
FIG. 23-24 depict group chat interface according to a preferred embodiment of the disclosed invention.
Figure 24:
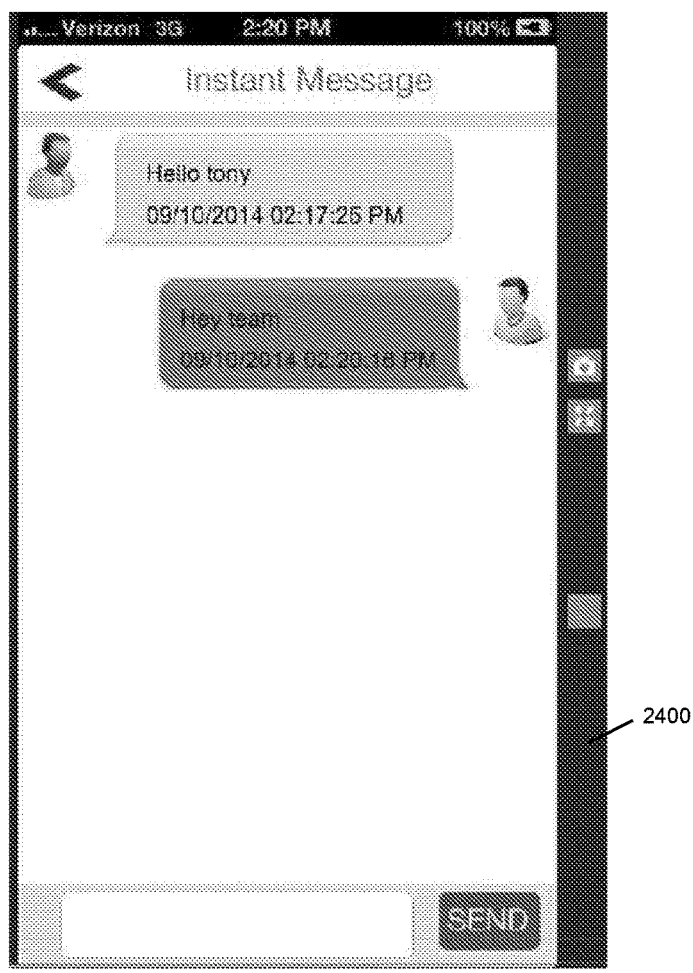
Figure 25:
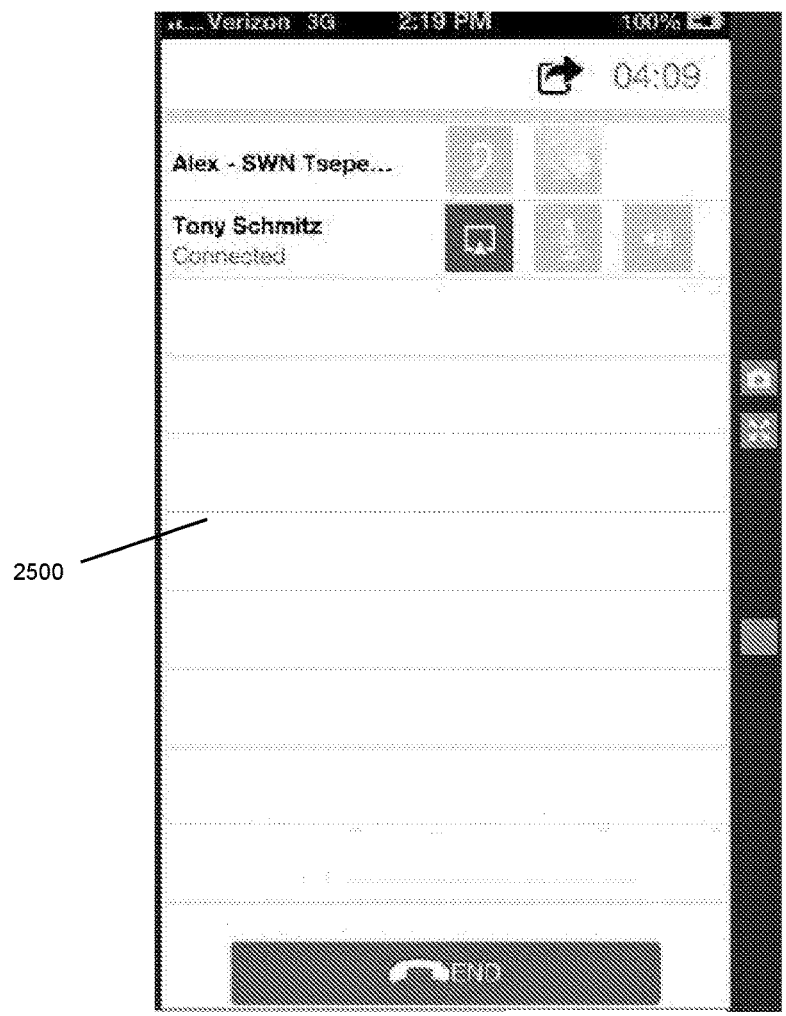
FIG. 25 illustrates interface which represents a display available to a user connected to a participant in the midst of a conference call.
Figure 26:
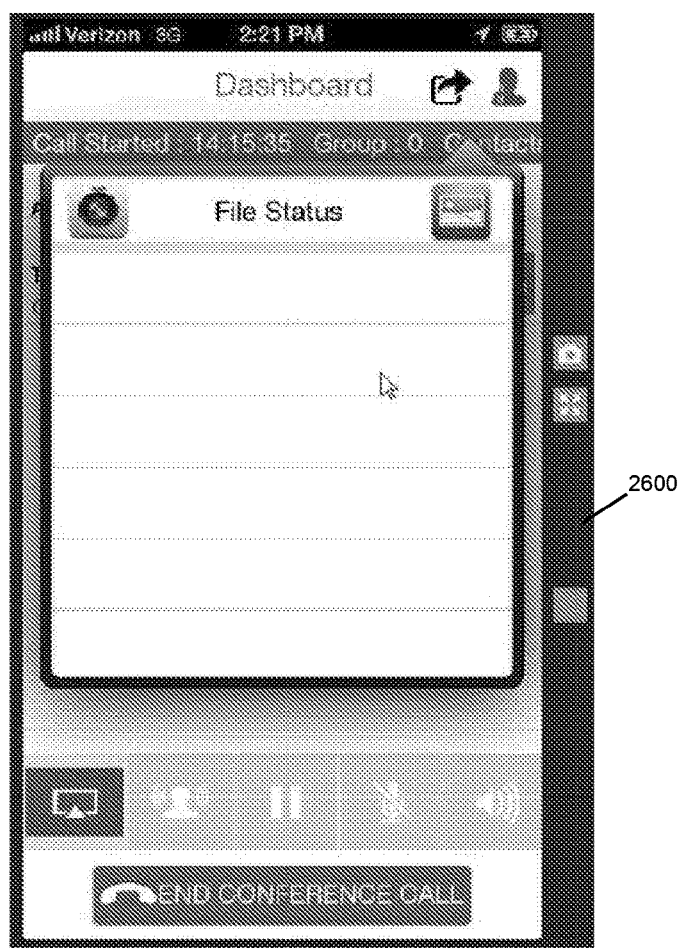
FIGS. 26-27 illustrates interface displaying status of files shared between a user and a participant.

The user may initiate an instant messaging session or a group chat while an ongoing conference call is still in session as illustrated via interfaces 2300 and 2400 shown in FIGS. 23 and 24 respectively. Referring now to FIG. 25 illustrates interface 2500 which represents a display available to a user connected to a participant in the midst of a conference call. FIG. 26 illustrates interface 2600 displaying status of files shared between a user and a participant.

Figure 27:
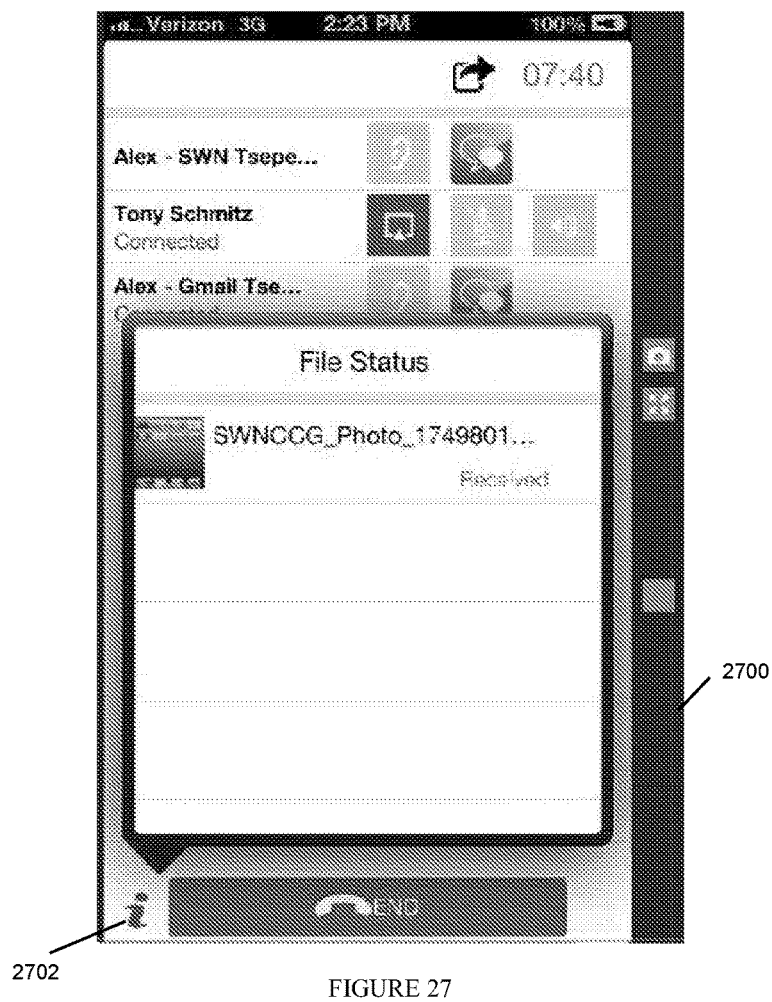
Figure 28:
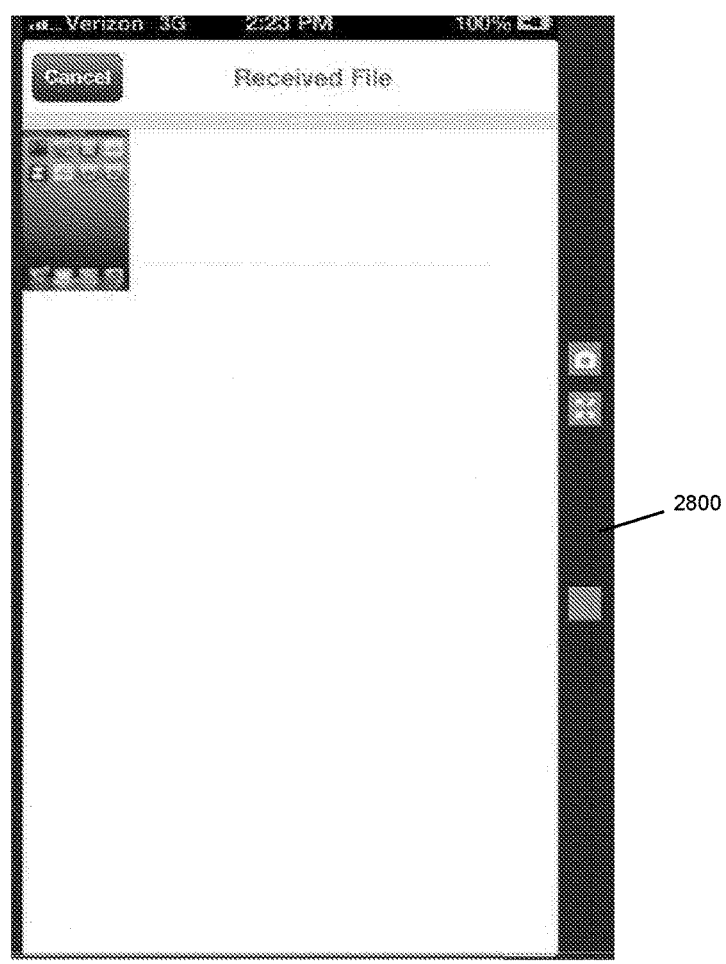
FIG. 28 depicts interface displaying received media files shared between a user and a participant.
Figure 29:
FIG. 29 represents photograph capture interface of the disclosed invention.

Similarly, FIG. 27 shown on interface 2700 also displays status of shared files. Additionally, by selecting an italicized i icon 2702 on the interface 2700, a recipient of a media file may view an image sent to the receiving user by a sending user. Upon a recipient of a media file selecting option 2702, interface 2800 shown in FIG. 28 is displayed, which illustrates a list of received files which may present an option to the recipient to view the received or shared media file. FIG. 29 represents interface 2900 which indicates an option 2910 which allows a user to capture a photograph of the user during an ongoing conference call and send the captured photograph to another user while the conference call is still in session.

Figure 30:
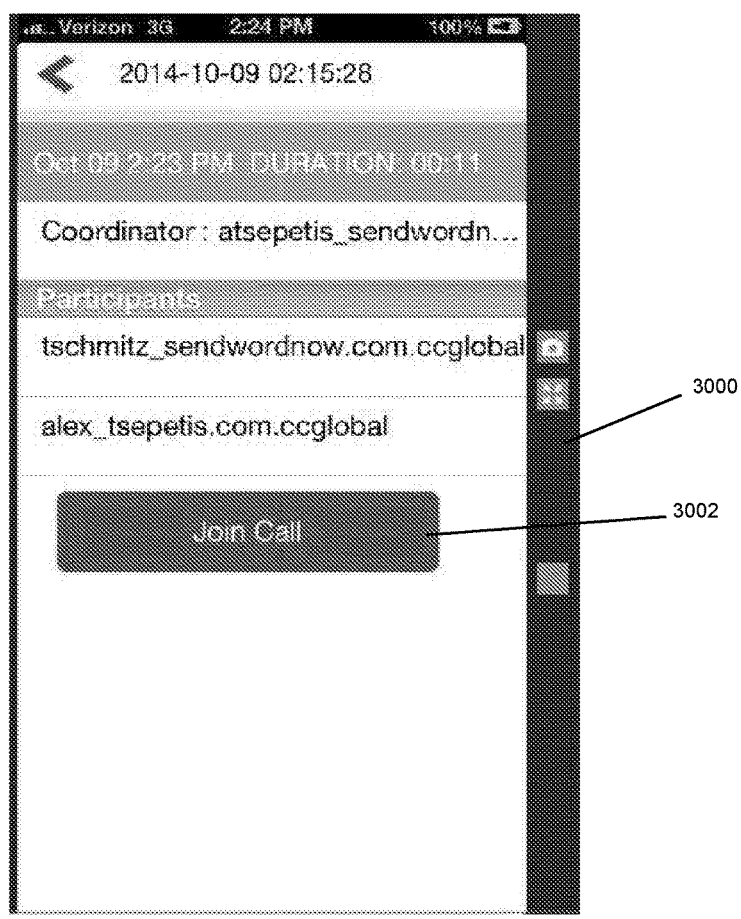
FIG. 30 indicates join call interface of the disclosed invention.

The claimed system and method allows an organizer of a conference call to add a participant to an ongoing conference call. If a conference call participant accidently drops out of the conference call, then the organizer or the dropped participant may take measures to reestablish the communication link to reconnect with the dropped participant. For example, the dropped out participant can select a join call option 3002 as displayed on an interface 3000 in FIG. 30 in order to rejoin the conference call from which the participant was previously dropped.

Likewise, the claimed system and method allows the organizer to reconnect with the dropped participant, without having the organizer to identify contact number of a dropped participant and having to dial the identified contact number of the participant that has been dropped from a call. When the organizer invites the dropped participant to reconnect the conference call, then the participant who has previously been dropped from the conference call may receive a prompt to re-join said call without having to dial the conference call number or retrieve the conference call log-in information.

Figure 31:
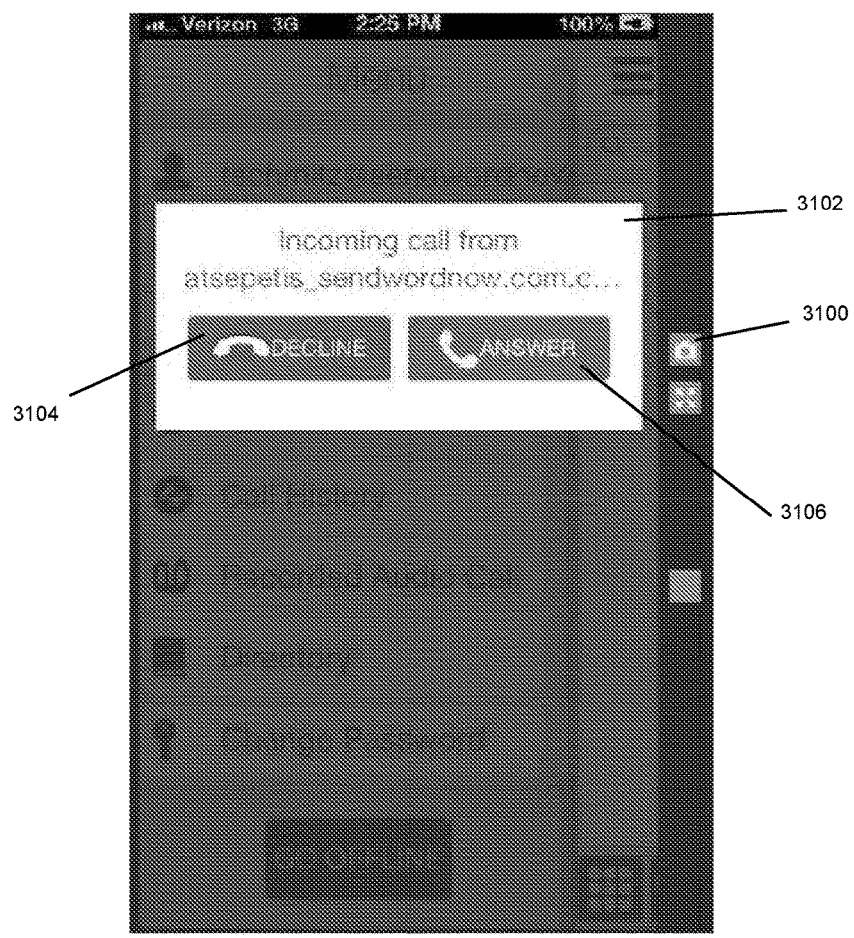
FIG. 31 illustrates interface displaying incoming call indication notification.

FIG. 31 illustrates interface 3100 displaying incoming call indication notification 3102. In response to this notification, the previously dropped out participant may rejoin the call by selecting accept option 3106 or decline using option 3104. This technology allows an organizer to preserve a bridge connecting a participant to said organizer or to another participant.

The claimed system and method allows a user to transfer host capabilities to another participant. This phenomenon is illustrated in an interface 3200 shown in FIG. 32. In this context, a host is where the audio stream is mixed pre-transmission. This feature may be helpful when a current host becomes unavailable or is otherwise not a desired candidate to conduct host functions for example, current host has a poor or no communication link, has a less desired standpoint than that of the host, has medical emergency, has other prior commitments, and the like. In this situation, the conference call organizer may be presented with an option 3202 to select a substitute host.

Figure 33:
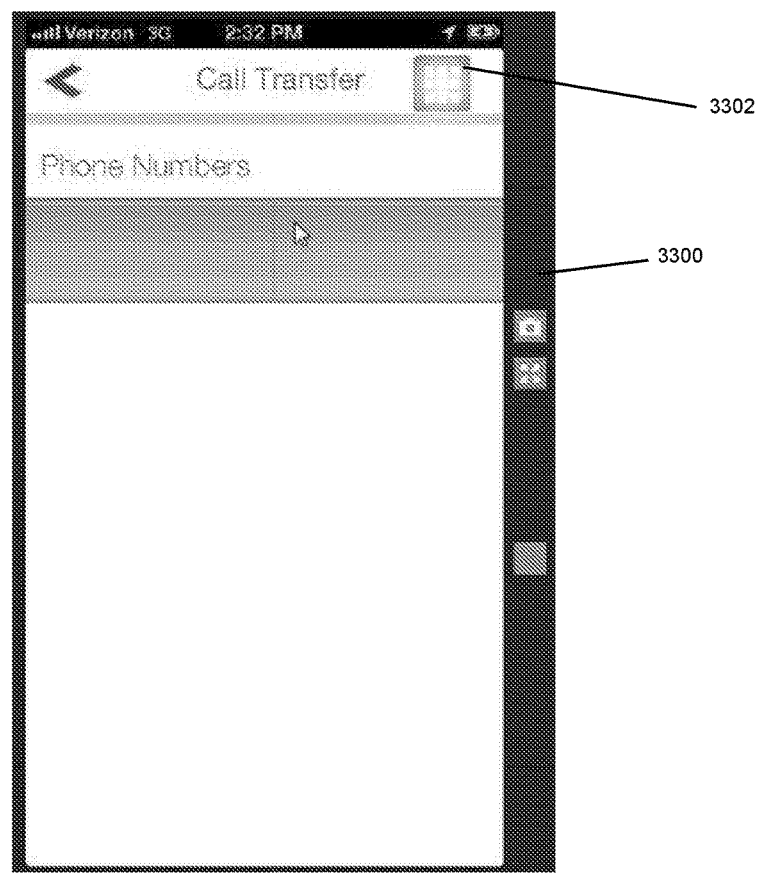
FIG. 33 represents interface displaying a call transfer option available for a user, according to a preferred embodiment of the disclosed invention.

FIG. 33 represents interface 3300 displaying a call transfer option 3302 available for a user, whereby a user may transfer a call to another phone number by dialing in a desired phone number. The claimed system and method will dial the desired phone number and transfer the call to the desired phone number to improve the quality of the communication link.

Figure 34:
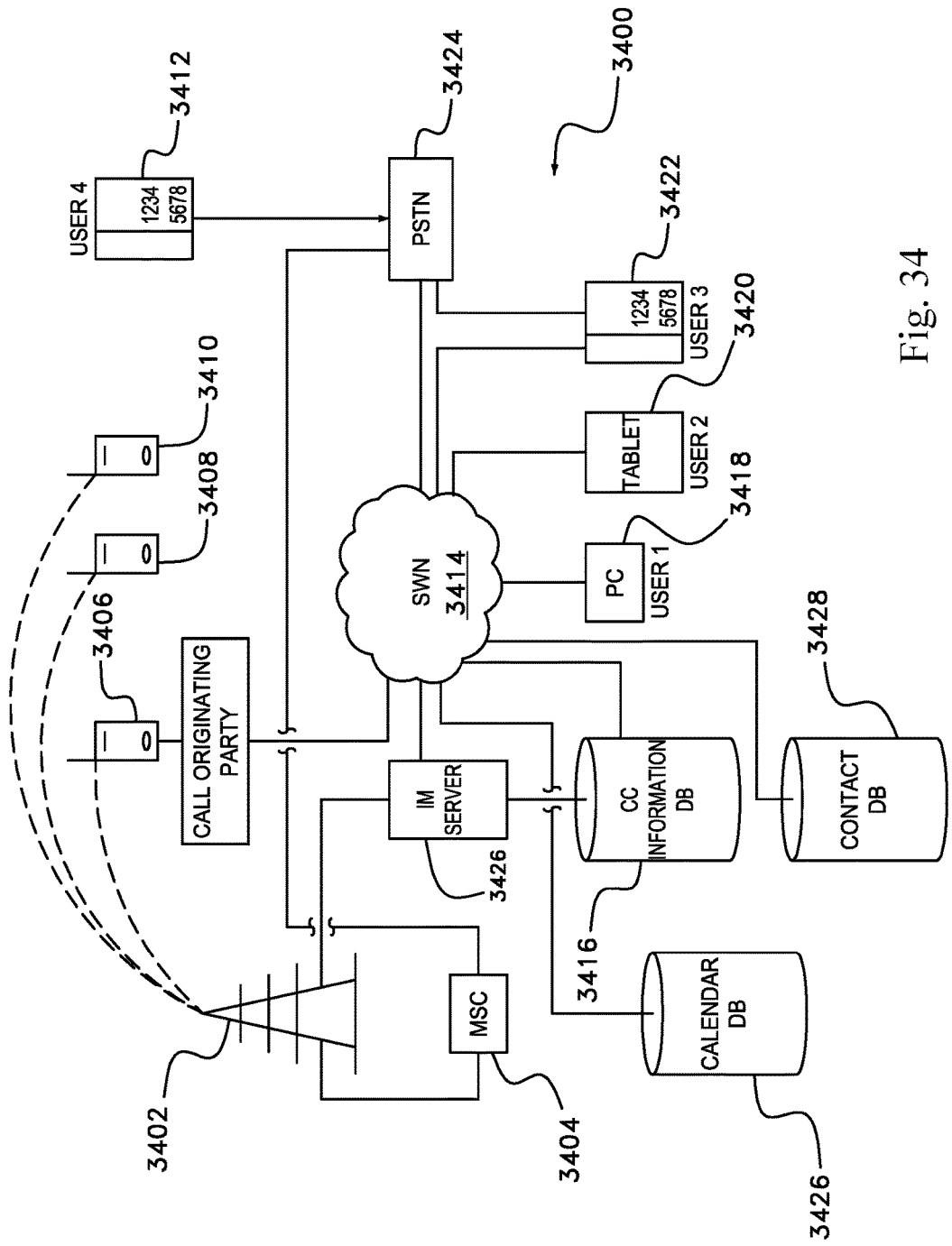
FIG. 34 illustrates an integrated communications network block diagram of the preferred embodiment of the disclosed invention.

FIG. 34 illustrates an integrated communications network 3400. The network includes a base station 3402 coupled to a mobile switching center (MSC) 3404, mobile terminals 3406, 3408, and 3410. The network 3400 also includes a SWN cloud 3414, personal computer 3418, a computing device 3420, a landline telephone 3422, and PSTN 3424. In the example communications network 3414, some of the aforementioned communication devices may have the disclosed system application installed, which may enable the devices to exchange voice and data with other computing devices in real-time.

FIG. 34 illustrates several databases such as a conference call information database 3416, a contact database 3428, and a calendar database 3426 in communication link with the communications network 3414, many other databases may be included in the disclosed system to facilitate conference call switching as disclosed herein.

Notably landline telephone 3412 and 3422 may not have the disclosed application installed. Nevertheless, the call originating party 3406 may via dial in option 1504 shown in FIG. 15 call the landline telephones 3412 and 3422. The disclosed system may use instant messaging server 3426 to offer services, such as, short message service (SMS) messages to send messages via the instant messaging while an ongoing conference call is in progress. Conference calls may be conducted and managed in parallel to the instant messaging sessions among the conference call participants. The Network 3414 may be configured to execute server side instructions for the disclosed method.

On the other hand computing devices such as the personal computer 3418, the tablet 3420, and the cellular telephones 3408 and 3410 may be configured to execute client side instructions for the disclosed method. The client side computing devices may comprise non-transitory computer readable medium containing computer instructions configured to operate with electronic computer hardware to manage operations during a conference call held on a first communication device, the operations comprising enabling a user or a call originating party via cellular phone 3406 to start a chat session and engage in said chat session during the conference call. The instant messaging data and participant status information may be stored in the instant messaging server 3426. The disclosed method may store information pertaining to each conference call along with each conference call participant in a database 3416.

These two databases may work in conjunction to indicate status of each participant in the instant messaging session in real time. Likewise, the disclose method may also enable a user to view status of participants of a conference call in real time. This feature may be beneficial for example, when the conference call subject matter warrants a private discussion among a selected few members of the conference call. In other words, the disclosed method may enable a user to view status of a participant of a chat session during a conference call in real time, and also enable a user to view real time data pertaining to a participant of a conference call.

Notably, there may be a need to conduct and monitor multiple conference calls, for example, in a product development area, different teams may be assigned different modules of the product and team manager may have to take questions from team A which is responsible for product testing to team B which may be responsible for software development. In this situation the disclosed method may enable a user, in this case a team leader to view real time status of multiple conference calls, and also enable a participant to join a call. In this example, there may be a need to view a time map of deliverables and view a conference call schedule of other teams. Thus, the disclosed method may enable a user to view a calendar to identify the date and time of a call, enable a user to view details, including date, time, duration, and participants, of a conference call in real time.

Further, the disclosed method may enable a user to schedule a call, enabling a user to connect a user to a call during a call in progress, and enable a user to dial a participant using a touch screen number pad. The disclosed method may also enable a participant to share media files with another participant in real time, and take a photograph as well as share said photograph with at least one other participant. The disclosed method may also enable a user to call, during call, a participant who loses connection to a call. The disclosed system may provide a media sharing interface to the conference call participants to share media files with another participant of the conference call in real time. In one embodiment of the disclosed invention, the media sharing interface is a touch screen number pad.

Figure 35:
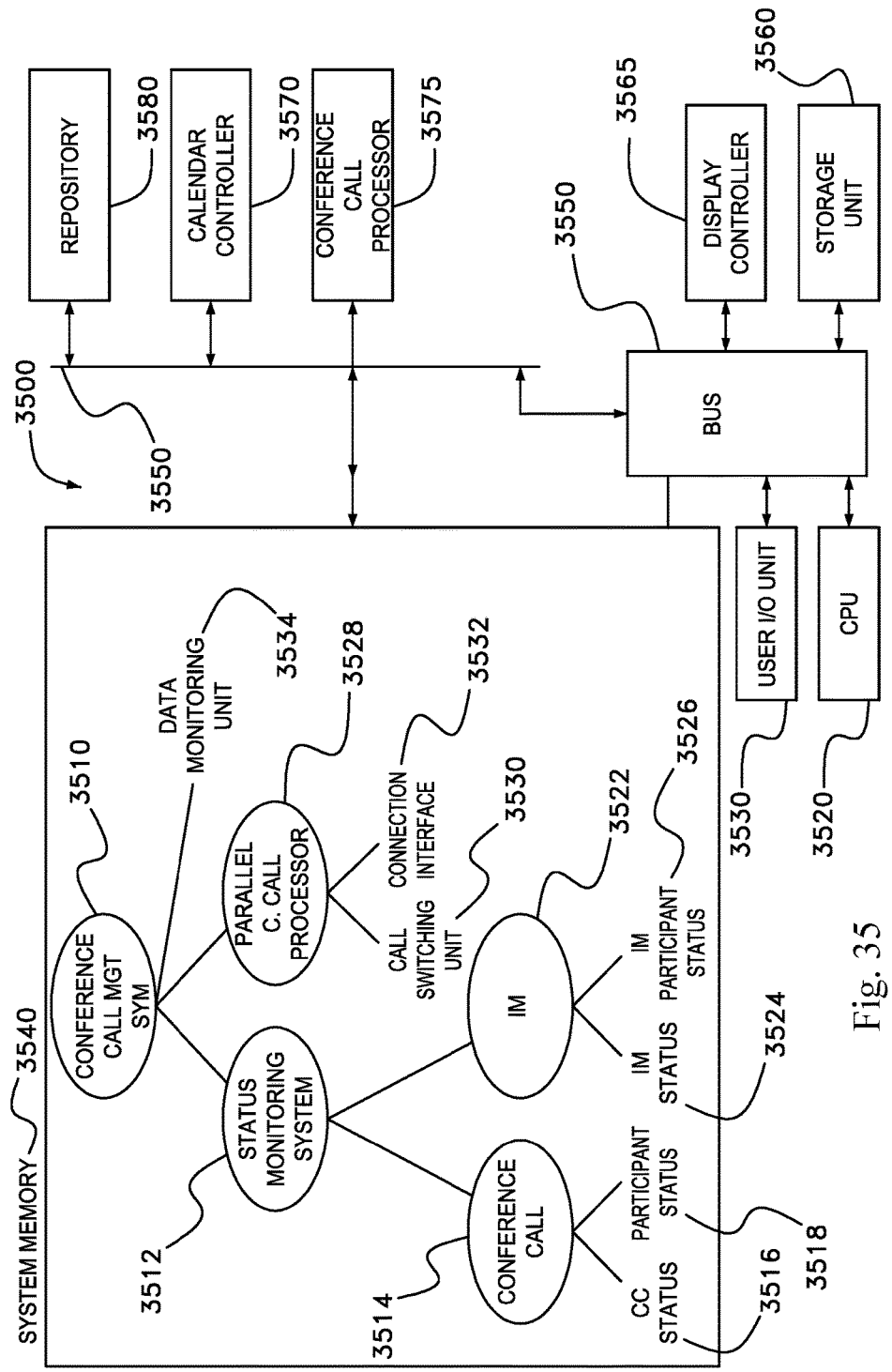
FIG. 35 illustrates a block diagram showing various components of the disclosed system according to the preferred embodiment of the disclosed invention.

Now turning to FIG. 35 a block diagram showing an embodiment of a computer system 3500 that can implement any of the embodiments of the conference call management system 3510 that are described herein. The computer system 3500 includes a processing unit 3520 (CPU), a system memory 3540, and a system bus 3550 that couples the processing unit 3520 to the various components of the computer system 3500. The processing unit 3520 may typically include one or more processors, each of which may be in the form of any one of various commercially available processors. A user input output unit 3530 may work in conjunction with the conference call management system 3510, a conference call processor 3575 and a display controller 3565 to accept input from and to display output to a user.

The system memory 3540 typically includes a read only memory (ROM) that stores a basic input/output system (BIOS) that contains start-up routines for the computer system 3500 and a random access memory (RAM). The system bus 3550 may be a memory bus, a peripheral bus or a local bus, and may be compatible with any of a variety of bus protocols. The computer system 3500 also includes a storage memory 3560 (e.g., a hard drive, a floppy drive, a CD ROM drive, magnetic tape drives, flash memory devices, and digital video disks) that is connected to the system bus 3550 and contains one or more computer-readable media disks that provide non-volatile or persistent storage for data, data structures and computer-executable instructions.

The disclosed system for non-transitory computer readable medium containing computer instructions configured to operate with electronic computer hardware to manage operations during a first conference call between a first communication device and a plurality of communication devices is shown in FIG. 35. The system comprising a calendar controller 3570 in communication with a repository 3580 causing a display of conference call information on a display of each of the plurality of communication devices involved in a given conference call. The repository 3580 may include several databases such as databases shown in FIG. 34 including but not limited to a calendar database 3426, a contact database 3428, a conference call information database 3416 and the like. Other databases well known in the telecommunication industry may also be included in the repository 3580.

A calendar display may be caused by a calendar controller 3570. The calendar display may be helpful to identify a set of attributes of at least one conference call in real time. The set of attributes may provide additional information pertaining to a given conference call, the additional information may for example include but is not limited to the conference call date, the conference call time, the conference call duration, a list of conference call participants, and the like. This feature may be useful in scheduling new conference calls or rescheduling previously scheduled conference calls.

The conference call management system 3510 may comprise a status monitoring system 3512 which may include a conference call unit 3514 and an instant messaging unit 3522. The conference call unit 3514 may further include a conference call status unit 3516 which may indicate status of each ongoing conference call. Similarly, the conference call unit 3514 may comprise a conference call participant status unit 3518 may indicate status of each participant of each ongoing conference call.

The conference call participant status unit 3518 of the disclosed system may display for each participant connected to the conference call, a connected status on a display of each of the plurality of communication devices. Likewise, the conference call participant status unit 3518 of the disclosed system may display for each participant disconnected from the conference call, a not-connected status on a display of each of the plurality of communication devices. Further, a connected participant of an ongoing conference call may initiate an outgoing call to establish a communication link with a disconnected participant. In one embodiment of the disclosed invention, the connection interface 3532 may comprise a re-connection interface for a conference call participant to establish a communication link with a participant who had previously established and subsequently lost a connection to the conference call, and wherein the re-connection interface is a touch screen number pad.

In other words, the disclosed system may comprise a participant status display interface 3518 to indicate a participant status of each participant of the conference call on a display of each of the plurality of communication devices in real time. Thus, the conference call status unit 3516 may indicate status of each ongoing conference calls, while a conference call participant status unit 3518 may indicate status of each participant of each ongoing conference call.

The instant messaging unit 3522 may include an instant messaging status unit 3524 which may indicate status of each ongoing instant messaging session. Similarly, an instant messaging participant status unit 3526 may indicate status of each participant of each ongoing instant messaging session.

The conference call management system 3510 may comprise a parallel conference call processor 3528 to schedule and initiate a second conference call during the ongoing first conference call. The parallel conference call processor 3528 may work in conjunction with the conference call processor 3575 to connect a participant in the first conference call to the second conference call while the first conference call is in progress.

In other words, the conference call status unit 3516 may retrieve status information of ongoing conference calls via calendar controller 3570 and repository 3580. A connection interface 3532 of the parallel conference call processor 3528 may present a list of ongoing conference calls on the on a display of each of the plurality of communication devices in real time. A user, who is a participant of a first conference call, may select a second ongoing conference call via the connection interface 3532. A call switching unit 3530 of the parallel conference call processor 3528 may place the first conference call on hold and designate the user as a participant of the selected second conference call. Resultantly, the parallel conference call processor 3528 may notify the conference call participant status unit 3518 of the disclosed system to indicate the status of the switching participant from connected to not connected or on hold for the first conference call and as connected for the second conference call. Accordingly, the disclosed system may display the conference call status of each ongoing conference call on the display of each of the plurality of communication devices, receive a selection of a specific conference call from a participant, and join the participant in the selected conference call.

In one embodiment of the disclosed invention, a user may initiate a third conference call during while the first conference call and the second conference call are still in session, and connect each participant in the first conference call and the second conference call to the third conference call while the first conference call and the second conference call are in progress. Alternatively, a user may initiate a third conference call during the ongoing first conference call and the second conference call, and connect a selected group of participants in the first conference call and the second conference call to the third conference call while the first conference call and the second conference call are in progress.

The instant messaging unit 3522 may include an instant messaging status unit 3524 which may indicate status of each ongoing instant messaging session. Similarly, an instant messaging participant status unit 3526 may indicate status of each participant of each ongoing instant messaging session. Thus, a user may initiate in real time, a chat session between at least two communication devices of the plurality of communication devices during the ongoing first conference call, and display a chat participant status on the at least two communication devices in real time. This feature may be helpful for example for two group leaders to have a private communication about a decision being made in a conference call in which the rest of the team members are connected.

The conference call management system 3510 may include a data monitoring unit 3534 to display real time data pertaining to each participant of each conference call on the display of each of the plurality of communication devices. For example, in the aforementioned case, the two group leaders may exchange performance record of an employee before assigning a critical project to the employee. This feature may be helpful in business and marketing world where media files pertaining to advertisements such as jingles, audio files, video clips and the like may be circulated at once in a conference call.

What is claimed is:

1. A method for non-transitory computer readable medium containing computer instructions configured to operate with electronic computer hardware to manage operations during a first conference call between a first communication device and a plurality of communication devices, comprising the following steps:
   displaying, in real time, a calendar on a display of each of the plurality of communication devices to identify a set of attributes of at least one conference call;
   scheduling and initiating a second conference call during the ongoing first conference call, and connecting a participant in the first conference call to the second conference call while the first conference call is in progress;
   displaying, in real time, on the display of each of the plurality of communication devices, a set of conference call attributes of each ongoing conference call, and a connection interface whereby a participant may selectively join an ongoing conference call, the set of conference call attributes comprising a conference call date, a conference call time, a conference call duration, a name of file received during the conference call, and a conference call participants list;
   displaying real time data pertaining to each participant of each conference call on the display of each of the plurality of communication devices, the real time data comprising: a participant name, a participant phone number, a participant email address, a participant status and a participant group identification; and
   detecting disconnection of a participant from an ongoing conference call and automatically redialing the number of the disconnected participant.

2. The method as in claim 1, further comprising the steps of:
   initiating a third conference call during the ongoing first conference call and the second conference call, and connecting a selected group of participants in the first conference call and the second conference call to the third conference call while the first conference call and the second conference call are in progress.

3. The method as in claim 1, further comprising the steps of:
   initiating a third conference call during the ongoing first conference call and the second conference call, and connecting each participant in the first conference call and the second conference call to the third conference call while the first conference call and the second conference call are in progress.

4. The method as in claim 1, wherein the set of attributes comprise the conference call date, the conference call time, the conference call duration, and a list of conference call participants.

5. The method as in claim 1, wherein the step of displaying a participant status of each participant of the conference call further comprising the steps of:
   displaying, for each participant connected to the conference call, a connected status on a display of each of the plurality of communication devices; and displaying, for each participant disconnected from the conference call, a not-connected status on a display of each of the plurality of communication devices.

6. The method as in claim 5, further comprising the step of initiating an outgoing call to establish a communication link with the disconnected participant.

7. The method as in claim 1, further comprising the steps of:
displaying the conference call status of each ongoing conference call on the display of each of the plurality of communication devices, receiving a selection a specific conference call from a participant, and joining the participant in the selected conference call.

8. The method as in claim 1, further comprising the step of:
providing a media sharing interface to the conference call participants to share media files with another participant of the conference call in real time.

9. The method as in claim 8, wherein the media sharing interface is a touch screen number pad.

10. The method as in claim 1, further comprising the steps of providing a reconnection interface for a conference call participant to establish a communication link with a participant who had previously established and subsequently lost a connection to the conference call.

11. The method as in claim 10, wherein the re-connection interface is a touch screen number pad.

12. The method as in claim 1, further comprising:
initiating, in real time, a chat session between at least two communication devices of the plurality of communication devices during the ongoing first conference call, and displaying a chat participant status on the at least two communication devices in real time.

13. A system for non-transitory computer readable medium containing computer instructions configured to operate with electronic computer hardware to manage operations during a first conference call between a first communication device and a plurality of communication devices, the system comprising:
a calendar display, on a display of each of the plurality of communication devices to identify a set of attributes of at least one conference call in real time;
a parallel call interface to schedule and initiate a second conference call during the ongoing first conference call, and to connect a participant in the first conference call to the second conference call while the first conference call is in progress;
display in real time, on the display of each of the plurality of communication devices, a set of conference call attributes status of each ongoing conference call, and a connection interface whereby a participant may selectively join an ongoing conference call, the set of conference call attributes comprising a conference call date, a conference call time, a conference call duration, a name of file received during the conference call, and a conference call participants list, wherein the system is configured to detect disconnection of a participant from an ongoing conference call and automatically redial the number of the disconnected participant; and display real time data pertaining to each participant of each conference call on the display of each of the plurality of communication devices, the real time data comprising: a participant name, a participant phone number, a participant email address, a participant status and a participant group identification.

14. The system as in claim 13, further comprising:
initiate a third conference call during the ongoing first conference call and the second conference call, and connecting each participant in the first conference call and the second conference call to the third conference call while the first conference call and the second conference call are in progress.

15. The system as in claim 14, further comprising:
initiate a third conference call during the ongoing first conference call and the second conference call, and connecting a selected group of participants in the first conference call and the second conference call to the third conference call while the first conference call and the second conference call are in progress.

16. The system as in claim 13, wherein the set of attributes comprise the conference call date, the conference call time, the conference call duration, and a list of conference call participants.

17. The system as in claim 13, further comprising:
display for each participant connected to the conference call, a connected status on a display of each of the plurality of communication devices; and
display for each participant disconnected from the conference call, a not-connected status on a display of each of the plurality of communication devices.

18. The system as in claim 17, further comprising
initiate an outgoing call to establish a communication link with the disconnected participant.

19. The system as in claim 13, further comprising:
display the conference call status of each ongoing conference call on the display of each of the plurality of communication devices, receive a selection a specific conference call from a participant, and join the participant in the selected conference call.

20. The system as in claim 13, further comprising:
a media sharing interface to the conference call participants to share media files with another participant of the conference call in real time.

21. The system as in claim 20, wherein the media sharing interface is a touch screen number pad.

22. The system as in claim 13, further comprising a re-connection interface for a conference call participant to establish a communication link with a participant who had previously established and subsequently lost a connection to the conference call, and wherein the re-connection interface is a touch screen number pad.

23. The system as in claim 13, further comprising:
initiate in real time, a chat session between at least two communication devices of the plurality of communication devices during the ongoing first conference call, and display a chat participant status on the at least two communication devices in real time.

* * * * *